(12) United States Patent
Baldemair et al.

(10) Patent No.: US 11,088,889 B2
(45) Date of Patent: Aug. 10, 2021

(54) SYSTEMS AND METHODS OF PROVIDING A GUARD INTERVAL FOR TRANSMISSIONS IN A COMMUNICATION SYSTEM

(71) Applicant: Telefonaktiebolaget LM Ericsson (publ), Stockholm (SE)

(72) Inventors: Robert Baldemair, Solna (SE); Martin Hessler, Linköping (SE); George Jöngren, Sundbyberg (SE); Eleftherios Karipidis, Stockholm (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 16/076,429

(22) PCT Filed: Feb. 17, 2017

(86) PCT No.: PCT/SE2017/050151
§ 371 (c)(1),
(2) Date: Aug. 8, 2018

(87) PCT Pub. No.: WO2017/142469
PCT Pub. Date: Aug. 24, 2017

(65) Prior Publication Data
US 2019/0052505 A1    Feb. 14, 2019

Related U.S. Application Data

(60) Provisional application No. 62/296,583, filed on Feb. 17, 2016.

(51) Int. Cl.
*H04L 27/26* (2006.01)
*H04L 1/00* (2006.01)
(Continued)

(52) U.S. Cl.
CPC ........ *H04L 27/2666* (2013.01); *H04L 1/0083* (2013.01); *H04L 27/2605* (2013.01);
(Continued)

(58) Field of Classification Search
CPC ............. H04L 27/2666; H04L 27/2605; H04L 1/0083; H04W 52/38; H04W 52/228; H04W 52/362
See application file for complete search history.

(56) References Cited

U.S. PATENT DOCUMENTS 9,001,757 B2 * 4/2015 Kimura ................. H04W 28/06
                                                        370/329
9,167,597 B2  10/2015 Singh et al.
(Continued)

FOREIGN PATENT DOCUMENTS

CN    1983854 A       6/2007
WO    2009148372 A1   12/2009
WO    2015047556 A1   4/2015

OTHER PUBLICATIONS

Extended European Search Report issued in corresponding EP Application No. 17753582.0 dated Oct. 31, 2019, 8 pages.
(Continued)

*Primary Examiner* — Andrew Lai
*Assistant Examiner* — Mohammed M Murshid
(74) *Attorney, Agent, or Firm* — Sage Patent Group

(57) ABSTRACT

A wireless device, a network node and methods performed by the wireless device and the network node for providing a guard interval for transmissions in a communication system are presented. The network node (301, 401) receives a signal (307, 407) transmitted by the wireless device (305, 405) and obtains a series of symbols (311a,b, 411a-g) from the received signal. In one exemplary embodiment, a method by the wireless device in a wireless communication (Continued)

system includes generating (705) the signal comprising the series of symbols, including a pair of consecutive symbols (311a,b, 411e,f, 411f,g) that are to be transmitted at different power levels, with power ramping (316, 416, 418) to occur over a power transition period (315, 415, 417) between the consecutive symbols. Further, the method includes transmitting (707) the transmit signal with a guard interval (313, 413a,b) overlapping at least partly with the power transition period.

20 Claims, 17 Drawing Sheets

(51) Int. Cl.
*H04W 52/36* (2009.01)
*H04W 52/38* (2009.01)
*H04W 52/22* (2009.01)

(52) U.S. Cl.
CPC ....... *H04W 52/228* (2013.01); *H04W 52/362* (2013.01); *H04W 52/38* (2013.01)

(56) References Cited

U.S. PATENT DOCUMENTS

| | | | |
|---|---|---|---|
| 2004/0208157 A1 | 10/2004 | Sander et al. | |
| 2004/0213145 A1* | 10/2004 | Nakamura | |
| 2006/0262879 A1 | 11/2006 | Smith et al. | |
| 2007/0058595 A1* | 3/2007 | Classon et al. | |
| 2007/0064669 A1* | 3/2007 | Classon | H04L 1/1822 370/347 |
| 2007/0142007 A1 | 6/2007 | Yan | |
| 2009/0046787 A1 | 2/2009 | Uesugi et al. | |
| 2012/0147795 A1* | 6/2012 | Narayan | H04W 52/362 370/281 |
| 2015/0085764 A1* | 3/2015 | Xiong | H04L 5/0048 370/329 |
| 2016/0105304 A1* | 4/2016 | Kwon | H04L 27/2607 370/338 |
| 2016/0205631 A1* | 7/2016 | Chen | H04W 52/146 455/522 |
| 2018/0205518 A1* | 7/2018 | Cheng | H04L 5/1469 |

OTHER PUBLICATIONS

Office Action issued in corresponding EP Application No. 17753582.0 dated Oct. 6, 2020, 7 pages.
Motorola, "SRS Open Issues", 3GPP TSG RAN WG4 #52bis, Miyazaki, JP, Oct. 12, 2009, pp. 1-8, R4-093865, 3GPP.
Qualcomm Incorporated, "Power Control Aspects of Multiple TA Operation", 3GPP TSG RAN WG1 #68, Dresden, DE, Feb. 6, 2012, pp. 1-3, R1-120540, 3GPP.
ETSI SMG, "Digital Cellular Telecommunication System (Phase 2+); Radio transmission and reception (GSM 05.05 version 5.8.0)", Tdoc SMG8 98p044, Draft, May 1, 1998, pp. 1-49, 5th Edition, ETSI.
3rd Generation Partnership Project, "Digital Cellular Telecommunication System (Phase 2+); Radio transmission and reception". 3GPP TS 05.05 version 8.20.0 Release 1999, ETSI TS 100 910 V8.20.0, Nov. 1, 2005, pp. 1-102, ETSI.
GSM, "Radio Sub-System Synchronisation", GSM recommendation 05.10, Nov. 27, 1989, pp. 1-5, Version 3.32.0, ETSI.
3rd Generation Partnership Project, "Digital Cellular Telecommunication System (Phase 2+); Radio Network Planning Aspects", 3GPP TR 03.30 version 8.4.0 Release 1999, Technical Report, ETSI TR 101 362 V8.4.0, Jun. 1, 2005, pp. 1-43, ETSI.
3rd Generation Partnership Project, "Universal Mobile Telecommunications System (UMTS); User Equipment (UE) radio transmission and reception (FDD)", Technical Specification, 3GPP TS 25.101 version 6.16.0 Release 6, ETSI TS 125 101 V6.1.0, Apr. 1, 2008, pp. 1-134, ETSI.
3rd Generation Partnership Project, "Universal Mobile Telecommunication System (UMTS); User Equipment (UE) radio transmission and reception (TDD)", Technical Specification, 3GPP TS 25.102 version 6.10.0 Release 6, ETSI TS 125 102 V6.10.0, Apr. 1, 2008, pp. 1-108, ETSI.
Qualcomm Incorporated: "Power Control aspects of multiple TA operation", 3GPP Draft; R1-120540 Power Control Aspects of Multiple TA Operation, 3rd Generation Partnership Project (3GPP), vol. RAN WG1 #68, Dresden, Germany; Feb. 2012.
Motorola; "SRS open issues", 3GPP Draft; R4-093866 Power Time Masks, 3rd Generation Partnership Project (3GPP); Miyazaki, Japan; Oct. 2009.

* cited by examiner

SYSTEMS AND METHODS OF PROVIDING A GUARD INTERVAL FOR TRANSMISSIONS IN A COMMUNICATION SYSTEM

FIELD OF DISCLOSURE

The present disclosure relates generally to the field of communications, and in particular to a wireless device, a network node and methods performed by the wireless device and the network node for providing a guard interval for transmissions in a communication system.

BACKGROUND

In Long Term Evolution (LTE), Sounding Reference Signals (SRS) are transmitted by user equipment (UE) to sound the channel in the uplink (UL) and to provide the evolved Node B (eNB) with Channel State Information (CSI). To enable CSI acquisition outside the currently scheduled bandwidth, SRS transmission bandwidth is not related to currently scheduled UL bandwidth. CSI obtained from SRS transmissions can be used at the eNB to schedule UL transmissions. Also, in reciprocal eNB implementations, SRS transmissions can be used to determine downlink (DL) precoder weights.

FIG. 1 shows an LTE subframe with a physical uplink shared channel (PUSCH) transmission and an SRS transmitted in the last symbol. In FIG. 1, the PUSCH and SRS bandwidths are different. Further, the PUSCH and SRS transmissions typically have different bandwidths. The PUSCH and SRS transmissions may share a common control loop or may have separate power control loops. These characteristics typically result in different power levels for SRS and PUSCH transmissions.

A Power Amplifier (PA) cannot instantaneously change its output power level but requires a ramp up or down time to adjust its power levels. As shown in FIG. 2, the power ramp occurs outside the SRS symbol during the PUSCH transmission. In LTE, the transient period is twenty microseconds (20 μsec.) and the SRS symbol duration is around seventy microseconds (70 μsec.), so performing the power ramp within the SRS symbol duration would impact more than half of the SRS symbol duration, resulting in severely degrading SRS performance.

PUSCH transmission would also be degraded by performing the power ramp within the PUSCH data symbol duration. This can be mitigated by the eNB adjusting the weighting of the soft values within the transient duration. This is further mitigated by the PUSCH data being time-domain interleaved (i.e., PUSCH bits are spread out in time). Even though PUSCH reception is impacted during the transient period due to time-domain interleaving, the signal can still be recovered. However, in some radio access technologies such as those considered for 5G standardization, data channels have little or no time-domain interleaving to enable early decoding. Since reduced latency is important in these 5G radio access technologies, little or no time-domain interleaving will be used, resulting in decreased data reception robustness during power ramps.

Accordingly, there is a need for improved techniques for providing a guard interval for transmissions in a communication system. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiments of the present disclosure relate to providing a guard interval for transmissions in a communication system. According to one aspect, a method performed by a wireless device in a wireless communication system is provided. The method includes generating a transmit signal comprising a series of symbols, including a pair of consecutive symbols that are to be transmitted at different power levels, with power ramping to occur over a power transition period between the consecutive symbols. Further, the method includes transmitting the transmit signal with a guard interval overlapping at least partly with the power transition period.

According to another aspect, the method may include transmitting the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

According to another aspect, the method may include transmitting the series of symbols within a subframe that comprises two or more symbol periods, with at least two symbol periods having different durations. Further, a duration of the guard interval may equal one of the different symbol period durations.

According to another aspect, the method may include transmitting the series of symbols within a subframe that comprises two or more symbol periods, with at least two symbol periods having different durations. Further, a duration of the guard interval may be a function of the different symbol period durations.

According to another aspect, the method may include transmitting the series of symbols within a subframe that comprises two or more symbol periods. Each symbol period in the subframe may have the same duration. Further, a duration of the guard interval may equal an integer multiple of the symbol period duration. Also, this integer multiple may be an integer with a value greater than or equal to one.

According to another aspect, the symbols may be orthogonal frequency division multiplexed (OFDM) symbols. Each OFDM symbol may include a first or a second cyclic prefix (CP). Further, a duration of the second CP may be equivalent to a duration of the first CP and an extended duration. Also, a duration of the guard interval plus the extended duration of the second CP may equal a predetermined duration.

According to another aspect, the symbols may be OFDM symbols. Each OFDM symbol may include a first or a second predetermined signal. A duration of the second predetermined signal may be equivalent to a duration of the first predetermined signal and an extended duration. Also, a duration of the guard interval plus the extended duration of the second predetermined signal may equal a predetermined duration.

According to another aspect, the predetermined duration may be at least one of (1) a difference between a duration of the subframe and a collective duration of the symbol periods in the subframe, (2) one of different symbol period durations in the subframe, (3) a duration defined as a function of different symbol period durations in the subframe, and (4) an integer multiple of a symbol period duration.

According to another aspect, the method may include receiving, by the wireless device, from a network node in the wireless communication system, an indication of whether to use the first or the second predetermined signal.

According to another aspect, the method may include receiving, by the wireless device, from a network node in the wireless communication system, an indication of whether the transmit signal is to be transmitted with the guard interval. Further, the method may include determining whether to transmit the transmit signal with the guard interval responsive to the indication.

According to one aspect, a wireless device is provided. The wireless device is configured to generate a transmit signal comprising a series of symbols, including a pair of consecutive symbols that are to be transmitted at different power levels, with power ramping to occur over a power transition period between the consecutive symbols. Further, the wireless device is configured to transmit the transmit signal with a guard interval overlapping at least partly with the power transition period.

According to another aspect, the wireless device may be configured to transmit the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

According to another aspect, the wireless device may be configured to transmit the series of symbols within a subframe that comprises two or more symbol periods, with at least two symbol periods having different durations. Further, a duration of the guard interval may equal one of the different symbol period durations.

According to another aspect, the wireless device may be configured to transmit the series of symbols within a subframe that comprises two or more symbol periods, with at least two symbol periods having different durations. Further, a duration of the guard interval may be a function of the different symbol period durations.

According to another aspect, the wireless device may be configured to transmit the series of symbols within a subframe that comprises two or more symbol periods. Each symbol period in the subframe may have the same duration. Further, a duration of the guard interval may equal an integer multiple of the symbol period duration. Also, the integer multiple may be an integer with a value greater than or equal to one.

According to another aspect, the wireless device may be configured to receive, from a network node in the wireless communication system, an indication of whether to use the first or the second predetermined signal.

According to another aspect, the wireless device may be configured to receive, from a network node in the wireless communication system, an indication of whether the transmit signal is to be transmitted with the guard interval. Further, the wireless device may be configured to determine whether to transmit the transmit signal with the guard interval responsive to the indication.

According to one aspect, a method performed by a network node in a wireless communication system is provided. The method includes receiving a signal having a series of symbols and with a guard interval overlapping at least partly with a power transition period. Further, the method includes obtaining the series of symbols from the received signal, including a pair of consecutive symbols transmitted at different power levels, with power ramping occurring over the power transition period between the consecutive symbols.

According to another aspect, the method may include receiving the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

According to another aspect, the method may include receiving the series of symbols within a subframe that comprises two or more symbol periods, with at least two symbol periods having different durations. Further, a duration of the guard interval may equal one of the different symbol period durations.

According to another aspect, the method may include receiving the series of symbols within a subframe that comprises two or more symbol periods, with at least two symbol periods having different durations. Further, a duration of the guard interval may be a function of the different symbol period durations.

According to another aspect, the method may include receiving the series of symbols within a subframe that comprises two or more symbol periods. Each symbol period in the subframe may have the same duration. Further, a duration of the guard interval may equal an integer multiple of the symbol period duration, with the integer multiple being an integer with a value greater than or equal to one.

According to another aspect, the method may include transmitting, by the network node, to a wireless device in the wireless communication system, an indication of whether to use the first or the second predetermined signal.

According to another aspect, the method may include determining whether a wireless device in the wireless communication system is to transmit the signal with the guard interval. In response to determining that the wireless device is to transmit the signal with the guard interval, the method may further include transmitting, by the network node, to the wireless device, an indication that the wireless device is to transmit the signal with the guard interval.

According to another aspect, a computer program comprising instructions which, when executed by at least one processor of a wireless device, causes the wireless device to perform any of the methods described herein.

According to one aspect, a network node is provided. The network node is configured to receive a signal having a series of symbols and with a guard interval overlapping at least partly with a power transition period. Further, the network node is configured to obtain the series of symbols from the received signal, including a pair of consecutive symbols transmitted at different power levels, with power ramping occurring over the power transition period between the consecutive symbols.

According to another aspect, the network node may be configured to receive the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

According to another aspect, the network node may be configured to receive the series of symbols within a subframe that comprises two or more symbol periods, with at least two symbol periods having different durations. Further, a duration of the guard interval may equal one of the different symbol period durations.

According to another aspect, the network node may be configured to receive the series of symbols within a subframe that comprises two or more symbol periods, with at least two symbol periods having different durations. Further, a duration of the guard interval may be a function of the different symbol period durations.

According to another aspect, the network node may be configured to receive the series of symbols within a subframe that comprises two or more symbol periods. Each symbol period in the subframe may have the same duration. Further, a duration of the guard interval may equal an integer multiple of the symbol period duration, with the integer multiple being an integer with a value greater than or equal to one.

According to another aspect, the network node may be configured to transmit, to a wireless device in the wireless communication system, an indication of whether to use the first or second predetermined signal.

According to another aspect, the network node may be further configured to determine whether a wireless device in the wireless communication system is to transmit the signal with the guard interval. In response to determining that the wireless device is to transmit the signal with the guard interval, the network node may be further configured to transmit, to the wireless device, an indication that the wireless device is to transmit the signal with the guard interval.

According to another aspect, a computer program comprising instructions which, when executed by at least one processor of a network node, causes the network node to perform any of the methods described herein.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
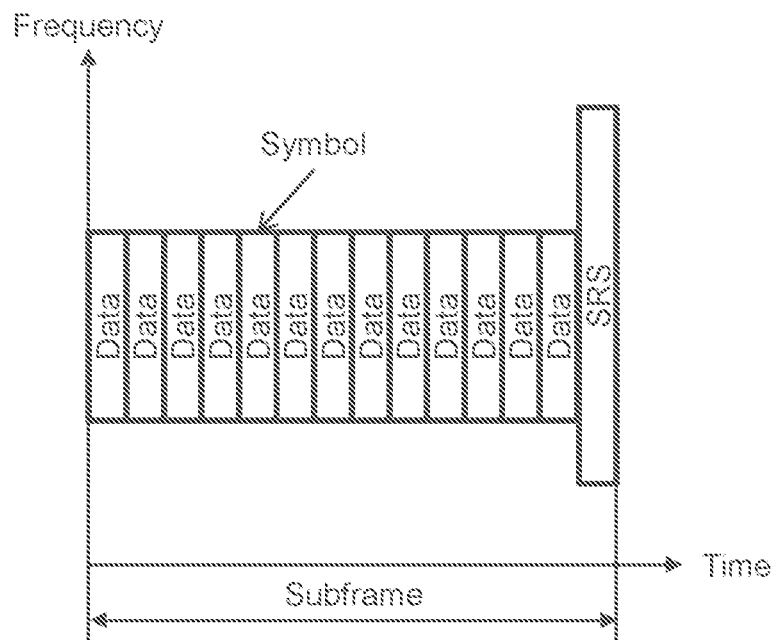
FIG. 1 is an LTE subframe with PUSCH and SRS transmission.
Figure 2:
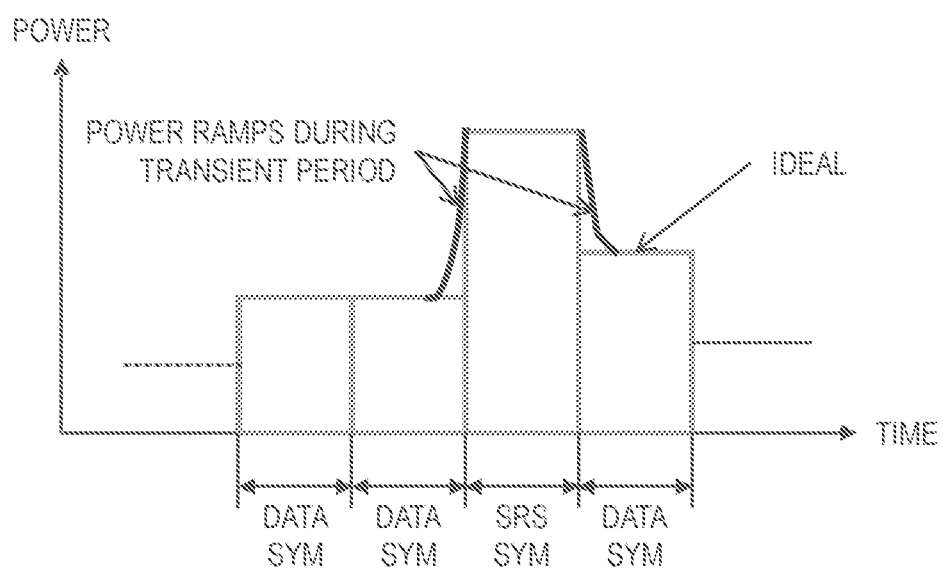
FIG. 2 is a power ramp of an SRS symbol.
Figure 3:
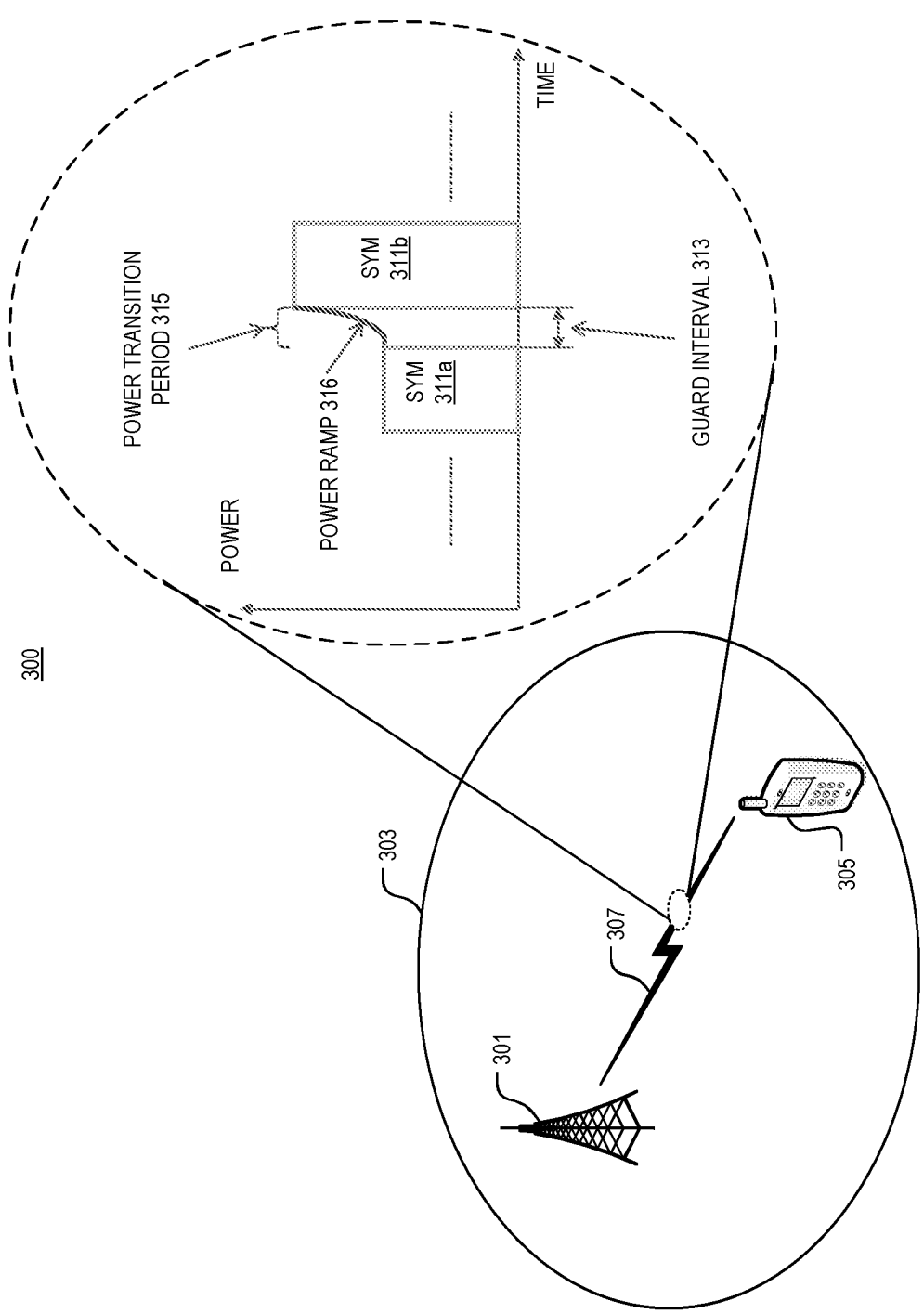
FIG. 3 illustrates one embodiment of a system for providing a guard interval for transmissions in a communication system in accordance with various aspects as described herein.

This disclosure includes describing systems and methods for providing a guard interval for transmissions in a communication system. For example, FIG. 3 illustrates one embodiment of a system 300 for providing a guard interval 313 for transmissions in a communication system in accordance with various aspects as described herein. In FIG. 3, the system 300 includes a network node 301 with coverage area 303. The network node 301 may be configured to support one more communication systems such as LTE, Universal Mobile Telecommunications Service (UMTS), Global System for Mobile communications (GSM), or the like. Further, the network node 301 may be a base station, an access point, or the like. The network node 301 may serve wireless device 305. The wireless device 305 may be configured to support one or more communication systems such as LTE, UMTS, GSM, or the like. Each of the network node 301 and the wireless device 305 may send different signals to the other. In one example, the network node 301 may transmit the signal 307 to the wireless device 305. In another example, the wireless device 305 may transmit the signal 307 to the network node 301. The signal 307 may include a series of symbols. Further, the series of symbols may include a pair of consecutive symbols 311a-b transmitted at different power levels (e.g., a Sounding Reference Signal, SRS, symbol at one power level and a data symbol at a different power level). A ramping up or down of the power 316 may occur over a power transition period 315 between the pair of consecutive symbols 311a-b. In addition, a guard interval 313 may overlap at least partially the power transition period 315.

In some embodiments, the guard interval 313 comprises a zero-valued signal transmission (e.g., a sequence of zeros) or a null transmission. In one embodiment, for instance, the signal 307 is transmitted over a wireless channel that linearly distorts the series of symbols, i.e. the series is prolonged in time. With the guard period 313, contributions from symbol n−1 are already faded out when symbol n starts at the receiver. This simplifies reception.

In one embodiment, the base station 301 may determine whether the wireless device 305 is to transmit the signal 307 with the guard interval 313. In response, the base station 301 may transmit an indication of whether the wireless device 305 is to transmit the signal 307 with the guard interval 313. Correspondingly, the wireless device 305 may receive the indication from the network node 301. In response to the indication, the wireless device 305 may determine whether or not to transmit the signal 307 with the guard interval 313.

As shown in FIG. 3, the guard interval 313 in some embodiments may comprise a contiguous interval between consecutive symbols 311a and 311b. In this case, for example, the guard interval 313 may be one-sided in the sense that it is disposed immediately before or immediately after one of the symbols 311a or 311b in the pair.

In other embodiments, though, the guard interval may comprise a non-contiguous interval, e.g., with one or more symbols (at the same transmit power) intervening between different parts of the guard interval. In this case, the guard interval may be two-sided in the sense that it is disposed both immediately before and immediately after a set of one or more symbols that are to be transmitted at the same transmit power. For example, where the set of one or more symbols is flanked on both sides (i.e., before and after) by symbols transmitted at a power level different than that at which the set is transmitted, the set of one or more symbols may thereby be flanked on both sides by power transition periods. In some embodiments, the guard interval may be non-contiguously distributed into two parts, with one part before and one part after the set, so as to immediately surround the set of one or more symbols. In this way, the non-contiguous guard interval may collectively "guard" the set of one or more symbols.

Figure 4:
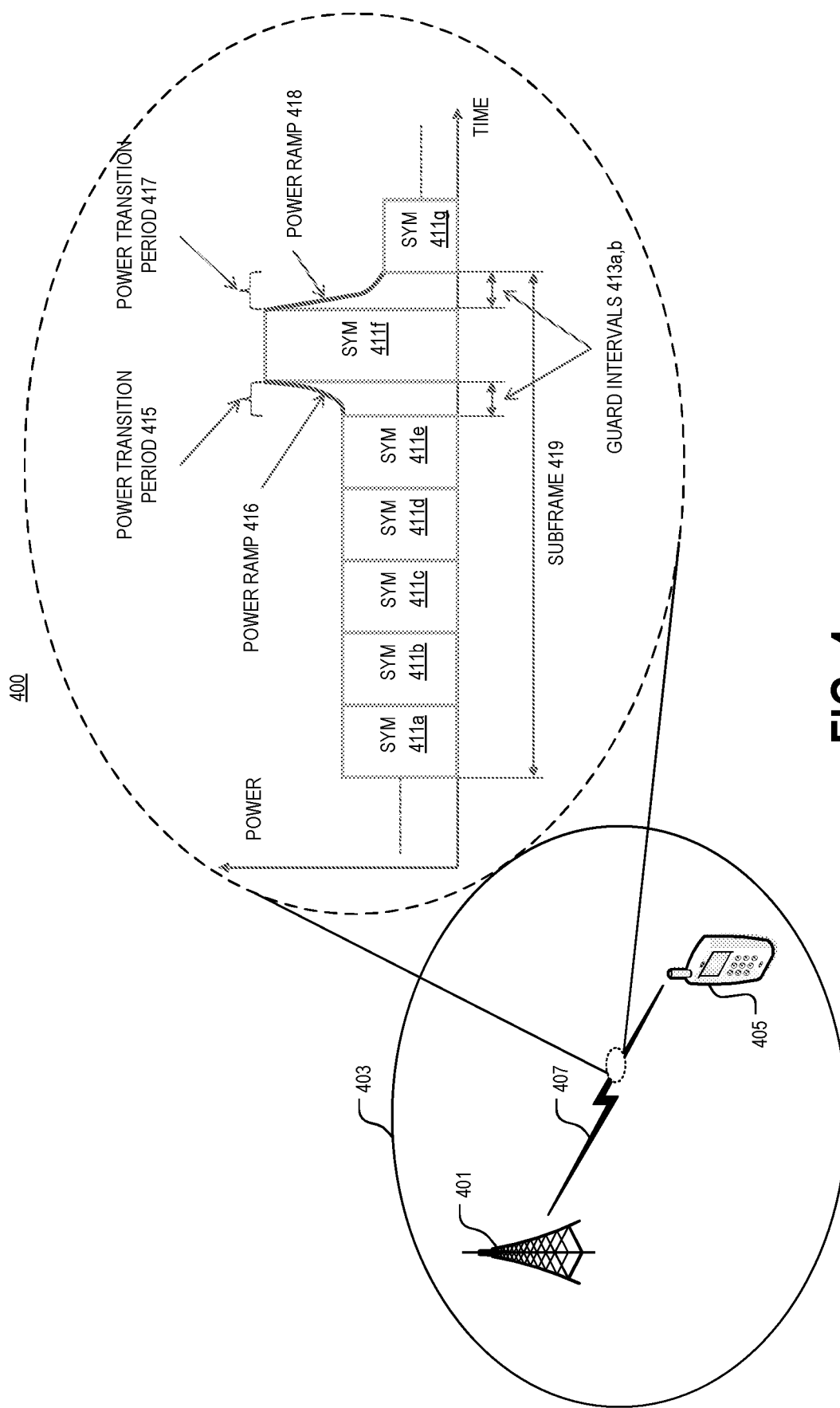
FIG. 4 illustrates another embodiment of a system for providing a guard interval for transmissions in a communication system in accordance with various aspects as described herein.

FIG. 4 illustrates an embodiment where the guard interval 313 of FIG. 3 is a non-contiguous interval. As shown, the transmit signal 407 may include a series of symbols 411a-g. This series may include different pairs of consecutive symbols, including pairs 411e-f and 411f-g. A subframe 419 may include symbols 411a-f. Further, a next subframe may include symbol 411g. The different symbols of any given pair may be transmitted at different power levels. As shown, for instance, symbols 411e and 411f are transmitted at different power levels, and symbols 411f and 411g are transmitted at different power levels. Further, power ramping 416 may occur over the power transition period 415 between the pair of consecutive symbols 411e-f and power ramping 418 may occur over the power transition period 417 between the pair of consecutive symbols 411f-g. The wireless device 405 may then transmit the signal 407 with guard intervals 413a,b overlapping at least partly with the respective power transition periods 415 and 417. That is, the guard intervals 413a,b represent a non-contiguous interval, part of which overlaps at least partly with the power transition period 415 and part of which overlaps at least partly with the power transition period 417.

In FIG. 4, in one operation, the wireless device 405 may receive from the base station 401 an indication of whether the guard intervals 413a,b are to be used. In response to the indication, the wireless device 405 may determine to transmit the signal 407 with the guard intervals 413a,b. In response, the wireless device 405 may generate the signal 407 having the series of symbols 411a-g with the pairs of consecutive symbols 411e-f and 411f-g with each symbol of each pair being transmitted at different power levels. Further, the power ramping may occur over the power transition period 415 between the pair of consecutive symbols 411e-f and the power ramping may occur over the power transition period 417 between the pair of consecutive symbols 411f-g. The wireless device 405 may then transmit the signal 407 with the guard intervals 413a,b overlapping at least partly with the respective power transition periods 415 and 417.

In the current embodiment, in another operation, the base station 401 may determine whether the wireless device 405 is to transmit the signal 407 with the guard interval 413. In response, the base station 401 having coverage area 403 may transmit an indication of whether the wireless device 405 is to transmit the signal 407 with the guard interval 413. The base station 401 may receive the signal 407 having the series of symbols 411a-g including the pairs of consecutive samples 411e-f and 411f-g. A ramp up or down of the power may occur over the power transition periods 415 and 417 between the consecutive symbols 411e-f and 411f-g, respectively. Further, the guard interval 413 may overlap at least partly with the power transition periods 415 and 417. In addition, the base station 401 may obtain the series of symbols 411a-g from the signal 407, including the pairs of consecutive symbols 411e-f and 411f-g, with each symbol of each pair transmitted at different power levels.

Figure 5:
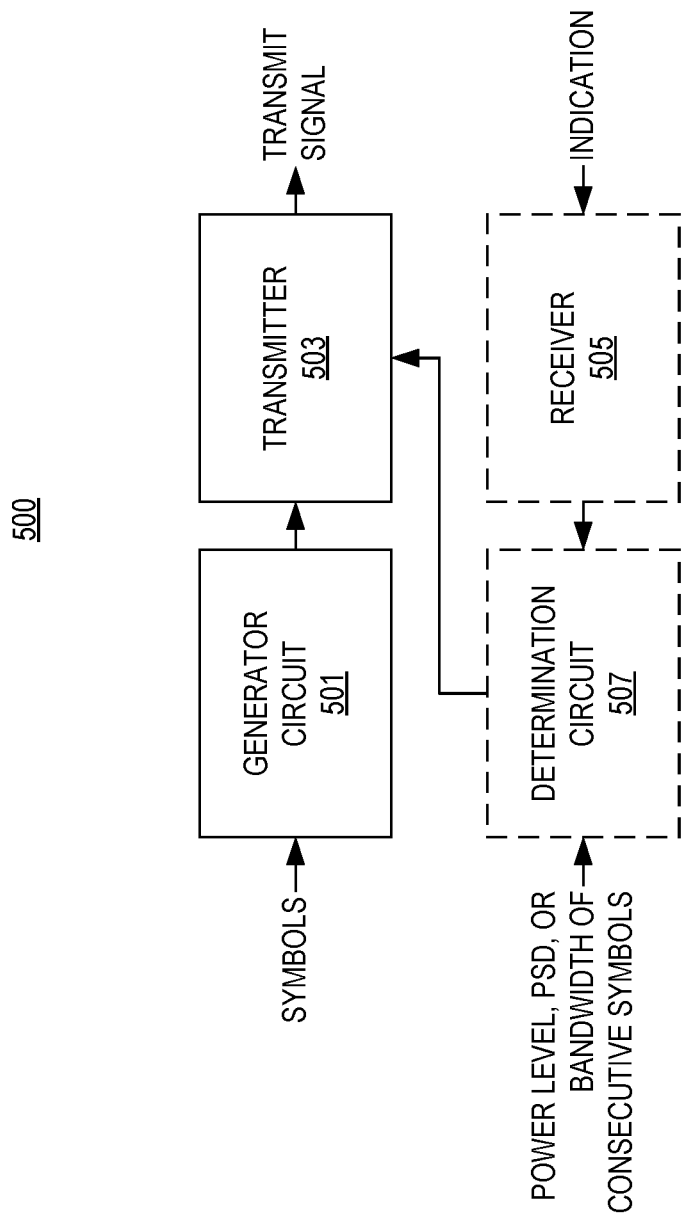
FIG. 5 illustrates one embodiment of a wireless device for providing a guard interval for transmissions in a communication system in accordance with various aspects as described herein.

FIG. 5 illustrates one embodiment of a wireless device 500 for providing a guard interval for transmissions in a wireless communication system in accordance with various aspects as described herein. In FIG. 5, the wireless device 500 (e.g., UE) may include a generator circuit 501, a transmitter or transmitter circuit 503, a receiver or receiver circuit 505, a determination circuit 507, the like, or any combination thereof. The generator circuit 501 is configured to generate the transmit signal comprising a series of symbols, including a pair of consecutive symbols that are to be transmitted at different power levels, with power ramping to occur over a power transition period between the consecutive symbols. The transmitter 503 is configured to transmit the transmit signal with the guard interval overlapping at least partly with the power transition period. The receiver or receiver circuit 505 may be configured to receive, from a network node in the wireless communication system, an indication of whether the transmit signal is to be transmitted with the guard interval. Further, the determination circuit 507 may be configured to determine whether to transmit the transmit signal with the guard interval based on the indication.

Figure 6:
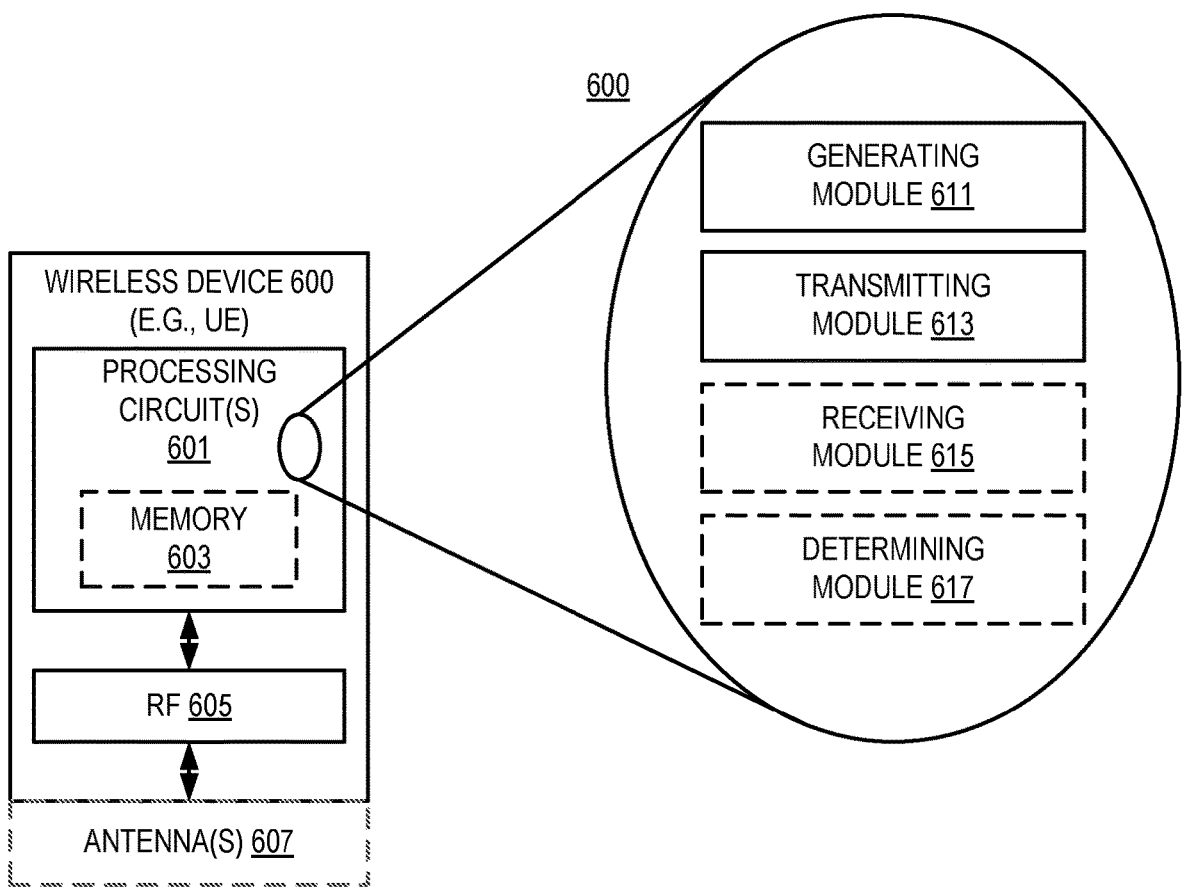
FIG. 6 illustrates another embodiment of a wireless device for providing a guard interval for transmissions in a communication system in accordance with various aspects as described herein.

FIG. 6 illustrates another embodiment of a wireless device 600 for providing a guard interval for transmissions in a wireless communication system in accordance with various aspects as described herein. In FIG. 6, the wireless device 600 (e.g., UE) may include processing circuit(s) 601, radio frequency (RF) communications circuit(s) 605, antenna(s) 607, the like, or any combination thereof. The RF communication circuit(s) 605 may be configured to transmit or receive information to or from one or more base stations via any communication technology. This communication may occur using the one or more antennas 607 that are either internal or external to the wireless device 600. The processing circuit(s) 601 may be configured to perform processing as described herein (e.g., the method of FIG. 7) such as by executing program instructions stored in memory 603. The wireless device 600 may implement various functional means, units, or modules (e.g., via the processing circuit(s) 601). These functional means, units, or modules (e.g., for implementing the method of FIG. 7) include a generating unit or module 611 for generating the transmit signal comprising a series of symbols, including a pair of consecutive symbols that are to be transmitted at different power levels, with power ramping to occur over a power transition period between the consecutive symbols. Further, these functional means, units, or modules include a transmitting unit or module 613 to transmit the transmit signal with the guard interval based on the indication. Also, these functional means, units, or modules may include a receiving unit or module 615 for receiving, from a network node in the wireless communication system, an indication of whether the transmit signal is to be transmitted with the guard interval. In addition, these functional means, units, or modules may include a determining unit or module 617 for determining whether to transmit the transmit signal with the guard interval based on the indication.

Figure 7:
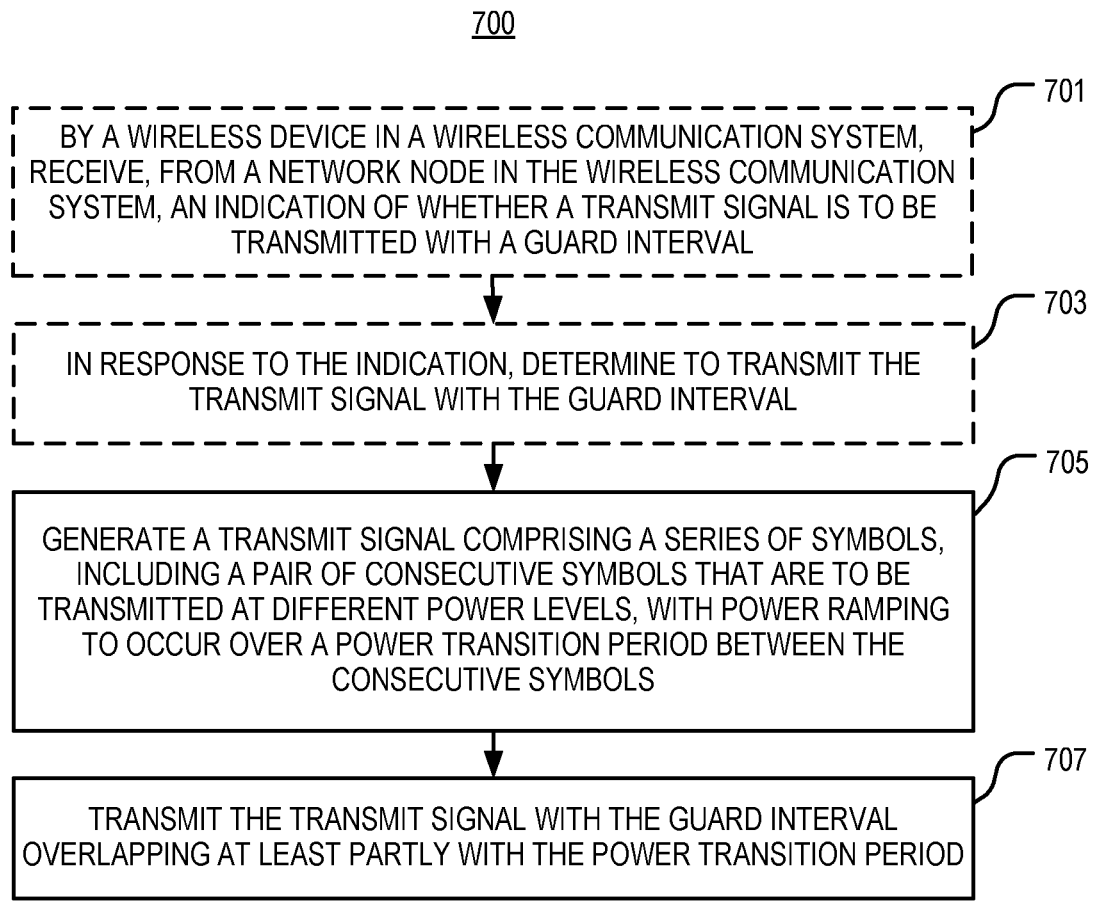
FIG. 7 illustrates one embodiment of a method by a wireless device for providing a guard interval for transmissions in a communication system in accordance with various aspects as described herein.

FIG. 7 illustrates one embodiment of a method 700 by a wireless device for providing a guard interval for transmissions in a wireless communication system in accordance with various aspects as described herein. In FIG. 7, the method 700 may start, for instance, at block 701 where it may include receiving, from a network node in the wireless communication system, an indication of whether a transmit signal is to be transmitted with a guard interval. In response to the indication, the method 700 may include determining to transmit the transmit signal with the guard interval, as referenced at block 703. At block 705, the method includes generating a transmit signal comprising a series of symbols, including a pair of consecutive symbols that are to be transmitted at different power levels, with power ramping to occur over a power transition period between the consecutive symbols. At block 707, the method includes transmitting the transmit signal with the guard interval overlapping at least partly with the power transition period.

Figure 8:
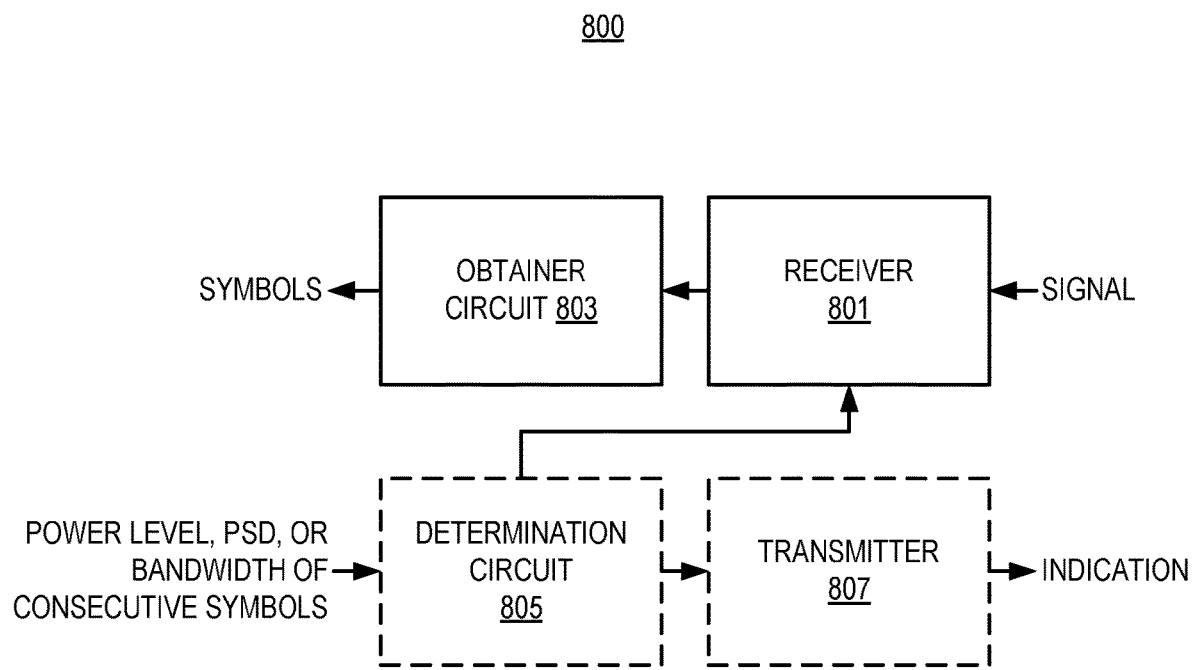
FIG. 8 illustrates one embodiment of a network node for providing a guard interval for transmissions in a communication system in accordance with various aspects as described herein.

FIG. 8 illustrates one embodiment of a network node 800 for providing a guard interval for transmissions in a wireless communication system in accordance with various aspects as described herein. In FIG. 8, the network node 800 (e.g., base station) may include a receiver or receiver circuit 801, an obtainer circuit 803, a determination circuit 805, a transmitter or transmitter circuit 807, the like, or any combination thereof. The receiver or receiver circuit 801 is configured to receive a signal having a series of symbols and with a guard interval overlapping at least partly with a power transition period. Further, the obtainer circuit 803 is configured to obtain the series of symbols from the received signal, including a pair of consecutive symbols transmitted at different power levels, with power ramping occurring over the power transition period between the consecutive symbols. Also, the determination circuit 805 may be configured to determine whether a wireless device in the wireless communication system is to transmit the signal with the guard interval. This determination may be based on whether the power, bandwidth, or Power Spectral Density (PSD) of the consecutive symbols associated with the guard interval are the same or substantially similar (i.e., within a certain range such as 10% or 1 dB). In addition, the transmitter or transmitter circuit 807 may be configured to transmit, to the wireless device, an indication of whether the wireless device is to transmit the signal with the guard interval.

Figure 9:
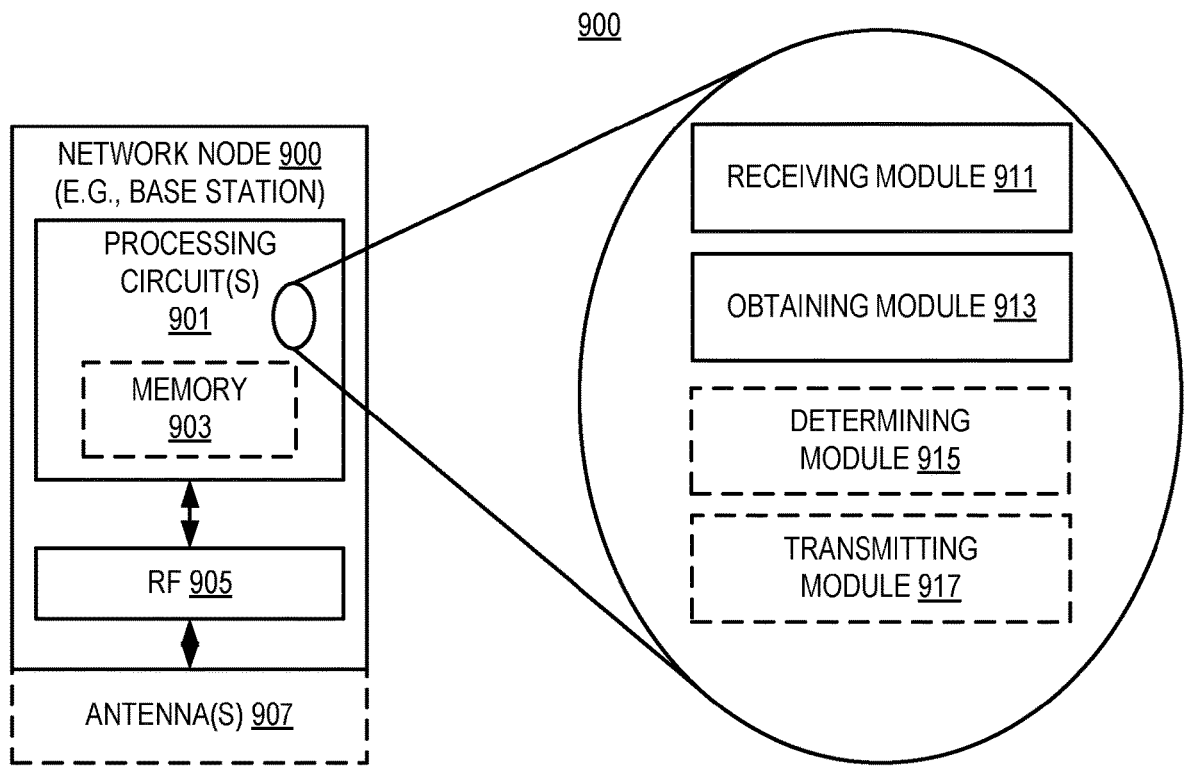
FIG. 9 illustrates another embodiment of a network node for providing a guard interval for transmissions in a communication system in accordance with various aspects as described herein.

FIG. 9 illustrates another embodiment of a network node 900 for providing a guard interval for transmissions in a wireless communication system in accordance with various aspects as described herein. In FIG. 9, the network node 900 (e.g., base station) may include processing circuit(s) 901, radio frequency (RF) communications circuit(s) 905, antenna(s) 907, the like, or any combination thereof. The RF communication circuit(s) 905 may be configured to transmit or receive information to or from one or more wireless devices via any communication technology. This communication may occur using the one or more antennas 907 that are either internal or external to the network node 900. The processing circuit(s) 901 may be configured to perform processing as described herein (e.g., the method of FIG. 10) such as by executing program instructions stored in memory 903. The network node 900 may implement various functional means, units, or modules (e.g., via the processing circuit(s) 901). These functional means, units, or modules (e.g., for implementing the method of FIG. 10) include a receiving unit or module 911 for receiving a signal having a series of symbols and with a guard interval overlapping at least partly with a power transition period. Further, these functional means, units, or modules include an obtaining unit or module 913 for obtaining the series of symbols from the received signal, including a pair of consecutive symbols transmitted at different power levels, with power ramping occurring over the power transition period between the consecutive symbols. Also, these functional means, units, or modules may include a determining unit or module 915 for determining whether a wireless device in the wireless communication system is to transmit the signal with the guard interval. In addition, these functional means, units, or modules may include a transmitting unit or module 917 for transmitting, to the wireless device, an indication of whether the wireless device is to transmit the signal with the guard interval.

Figure 10:
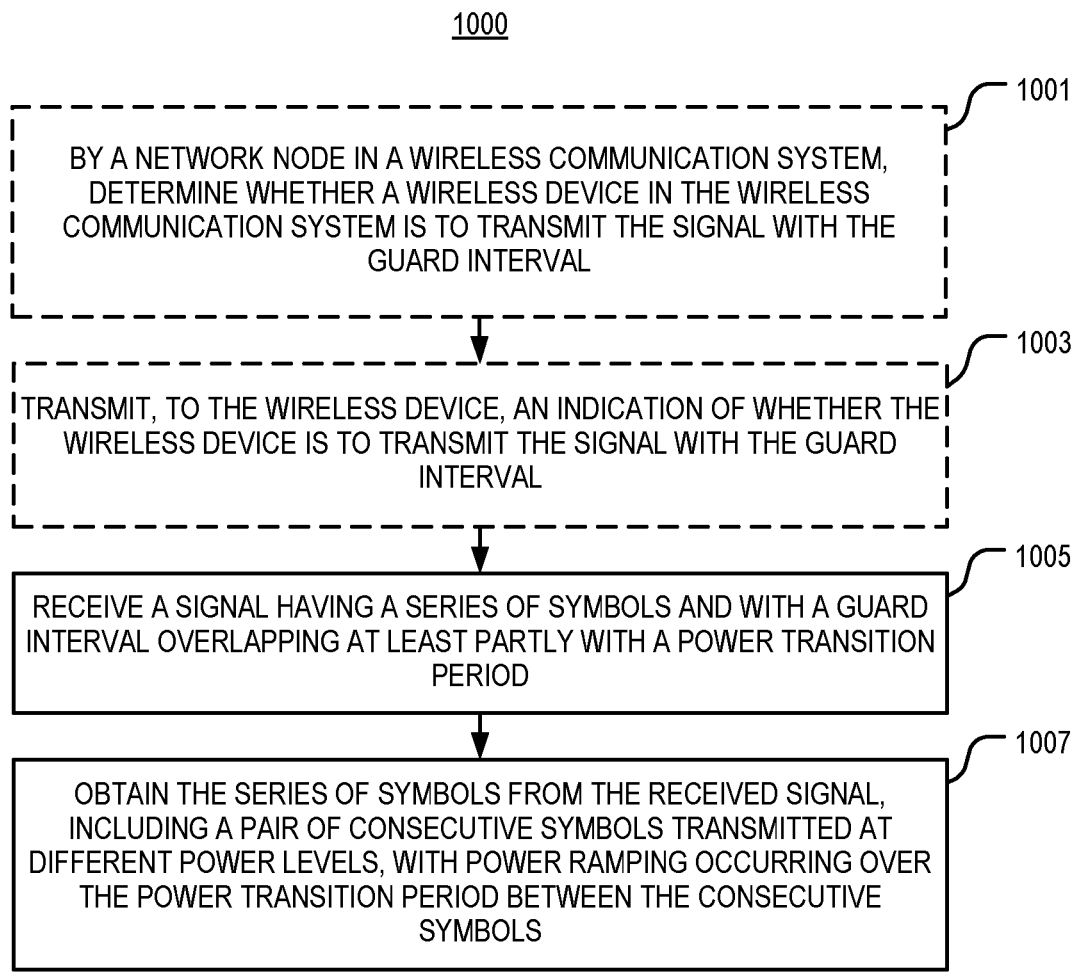
FIG. 10 illustrates one embodiment of a method by a network node for providing a guard interval for transmissions in a communication system in accordance with various aspects as described herein.

FIG. 10 illustrates one embodiment of a method 1000 by a network node for providing a guard interval for transmissions in a wireless communication system in accordance with various aspects as described herein. In FIG. 10, the method 1000 may start, for instance, at block 1001 where it may include determining whether a wireless device in the wireless communication system is to transmit the signal with the guard interval. At block 1003, the method 1000 may include transmitting, to the wireless device, an indication of whether the wireless device is to transmit the signal with the guard interval. At block 1005, the method 1000 includes receiving a signal having a series of symbols and with a guard interval overlapping at least partly with a power transition period. At block 1007, the method 1000 includes obtaining the series of symbols from the received signal, including a pair of consecutive symbols transmitted at different power levels, with power ramping occurring over the power transition period between the consecutive symbols.

Figure 11:
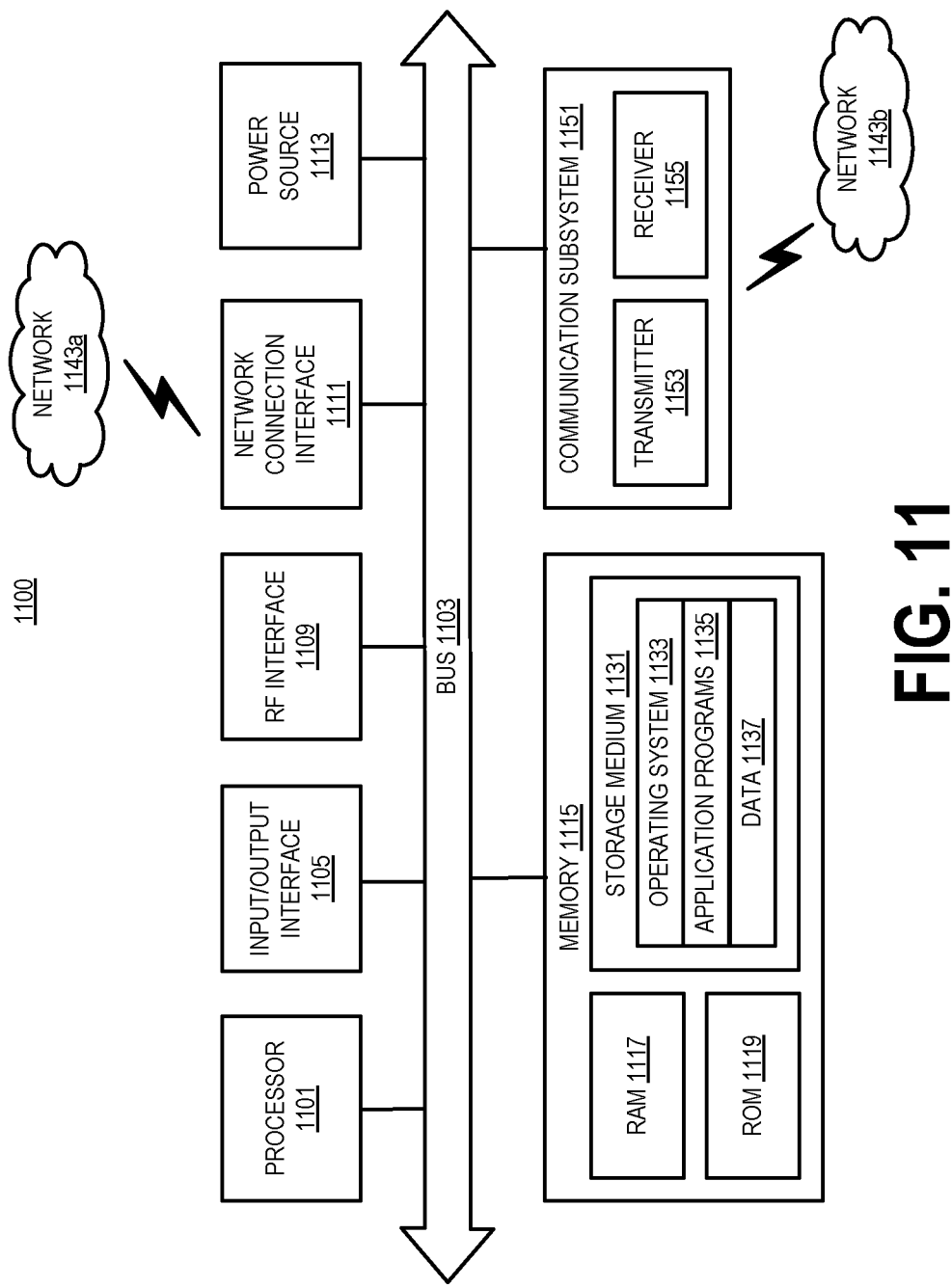
FIG. 11 illustrates another embodiment of a network node or a wireless device in accordance with various aspects as described herein.

FIG. 11 illustrates another embodiment of a radio node 1100, which may be a network node or a wireless device in accordance with various aspects as described herein. In some instances, the radio node 1100 may be referred as a network node, a base station (BS), an access point (AP), a wireless device, a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the radio node 1100 may be a set of hardware components. In FIG. 11, the radio node 1100 may be configured to include a processor 1101 that is operatively coupled to an input/output interface 1105, a radio frequency (RF) interface 1109, a network connection interface 1111, a memory 1115 including a random access memory (RAM) 1117, a read only memory (ROM) 1119, a storage medium 1131 or the like, a communication subsystem 1151, a power source 1113, another component, or any combination thereof. The storage medium 1131 may include an operating system 1133, an application program 1135, data 1137, or the like. Specific devices may utilize all of the components shown in FIG. 11, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 11, the processor 1101 may be configured to process computer instructions and data. The processor 1101 may be configured as any sequential state machine operative to execute machine instructions stored as machine-readable computer programs in the memory, such as one or more hardware-implemented state machines (e.g., in discrete logic, Field-Programmable Gate Array (FPGA), Application Specific Integrated Circuit (ASIC), etc.); programmable logic together with appropriate firmware; one or more stored-program, general-purpose processors, such as a microprocessor or Digital Signal Processor (DSP), together with appropriate software; or any combination of the above. For example, the processor 1101 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1105 may be configured to provide a communication interface to an input device, output device, or input and output device. The radio node 1100 may be configured to use an output device via the input/output interface 1105. A person of ordinary skill will recognize that an output device may use the same type of interface port as an input device. For example, a Universal Serial Bus (USB) port may be used to provide input to and output from the radio node 1100. The output device may be a speaker, a sound card, a video card, a display, a monitor, a printer, an actuator, an emitter, a smartcard, another output device, or any combination thereof. The radio node 1100 may be configured to use an input device via the input/output interface 1105 to allow a user to capture information into the radio node 1100. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, the RF interface 1109 may be configured to provide a communication interface to RF components such as a transmitter, a receiver, and an antenna. The network connection interface 1111 may be configured to provide a communication interface to a network 1143a. The network 1143a may encompass wired and wireless communication networks such as a local-area network (LAN), a wide-area network (WAN), a computer network, a wireless network, a telecommunications network, another like network or any combination thereof. For example, the network 1143a may be a Wi-Fi network. The network connection interface 1111 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1111 may implement receiver and transmitter functionality appropriate to the communication network links (e.g., optical, electrical, and the like). The transmitter and receiver functions may share circuit components, software, or firmware, or alternatively may be implemented separately.

In this embodiment, the RAM 1117 may be configured to interface via the bus 1103 to the processor 1101 to provide storage or caching of data or computer instructions during the execution of software programs such as the operating system, application programs, and device drivers. In one example, the wireless device 1100 may include at least one hundred and twenty-eight megabytes (128 Mbytes) of RAM. The ROM 1119 may be configured to provide computer instructions or data to the processor 1101. For example, the ROM 1119 may be configured to be invariant low-level system code or data for basic system functions such as basic input and output (I/O), startup, or reception of keystrokes from a keyboard that are stored in a non-volatile memory. The storage medium 1131 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1131 may be configured to include an operating system 1133, an application program 1135 such as a web browser application, a widget or gadget engine or another application, and a data file 1137.

In FIG. 11, the processor 1101 may be configured to communicate with a network 1143b using the communication subsystem 1151. The network 1143a and the network 1143b may be the same network or networks or different network or networks. The communication subsystem 1151 may be configured to include one or more transceivers used to communicate with the network 1143b. The one or more transceivers may be used to communicate with one or more remote transceivers of another wireless device such as a base station of a radio access network (RAN) according to one or more communication protocols known in the art or that may be developed, such as the Institute of Electrical and Electronics Engineers 802 Local Area Network (LAN) and Metropolitan Area Network (MAN) Standard (IEEE 802), Code Division Multiple Access (CDMA), Wideband CDMA (WCDMA), GSM, LTE, Universal Terrestrial Radio Access Network (UTRAN), Evolved UTRAN (E-UTRAN), Worldwide Interoperability for Microwave Access (WiMax), $5^{th}$ Generation wireless systems New Radio (5G NR), Narrow-Band Internet of Things (NB-IoT), or the like.

In another example, the communication subsystem 1151 may be configured to include one or more transceivers used to communicate with one or more remote transceivers of another wireless device such as user equipment according to one or more communication protocols known in the art or that may be developed, such as IEEE 802, CDMA, WCDMA, GSM, LTE, UTRAN, E-UTRAN, WiMax, 5G NR, NB-IoT, or the like. Each transceiver may include a transmitter 1153 and/or a receiver 1155 to implement transmitter and/or receiver functionality, respectively, appropriate to the RAN links (e.g., frequency allocations and the like). Further, the transmitter 1153 and the receiver 1155 of each transceiver may share circuit components, software or firmware, or alternatively may be implemented separately.

In the current embodiment, the communication functions of the communication subsystem 1151 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1151 may include cellular communication, Wi-Fi communication, Bluetooth communication, and GPS communication. The network 1143b may encompass wired and wireless communication networks such as a local-area network (LAN), a wide-area network (WAN), a computer network, a wireless network, a telecommunications network, another like network or any combination thereof. For example, the network 1143b may be a cellular network, a Wi-Fi network, and a near-field network. The power source 1113 may be configured to provide an alternating current (AC) or direct current (DC) power to components of the wireless device 1100.

In FIG. 11, the storage medium 1131 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 1131 may allow the radio node 1100 to access computer-executable instructions, application programs or the like, stored on transitory or non-transitory memory media, to off-load data, or to upload data. An article of manufacture, such as one utilizing a communication system may be tangibly embodied in storage medium 1131, which may comprise a computer-readable medium.

The functionality of the methods described herein may be implemented in one of the components of the radio node 1100 or partitioned across multiple components of the radio node 1100. Further, the functionality of the methods described herein may be implemented in any combination of hardware, software, or firmware. In one example, the communication subsystem 1151 may be configured to include any of the components described herein. Further, the processor 1101 may be configured to communicate with any of such components over the bus 1103. In another example, any of such components may be represented by program instructions stored in memory that when executed by the processor 1101 performs the corresponding functions described herein. In another example, the functionality of any of such components may be partitioned between the processor 1101 and the communication subsystem 1151. In another example, the non-computative-intensive functions of any of such components may be implemented in software or firmware and the computative-intensive functions may be implemented in hardware.

In one embodiment, a guard interval (also referred to as a guard period) may be introduced where substantial portions of the one or more power ramps occur. By doing so allows both the SRS and data symbols to be received with little or no impairment due to the one or more power ramps.

In another embodiment, a guard interval may be introduced before the SRS symbol, after the SRS symbol, or both. Further, the power ramps may occur during the guard period. The guard period may be provided by using one or more symbol durations within the subframe as guard time before or after the SRS symbol. Hence, the guard interval may be introduced where the majority of the power ramp occurs. This may allow both the SRS and data symbols to be received with little or no impairment due to the power ramps.

In another embodiment, a guard interval may be inserted before the SRS symbol, after the SRS symbol, or both. Any power ramps that occur when the PA power changes between an SRS symbol and a corresponding data symbol may occur within the guard interval, mitigating impairments on the reception of the SRS and data symbols.

Figure 12:
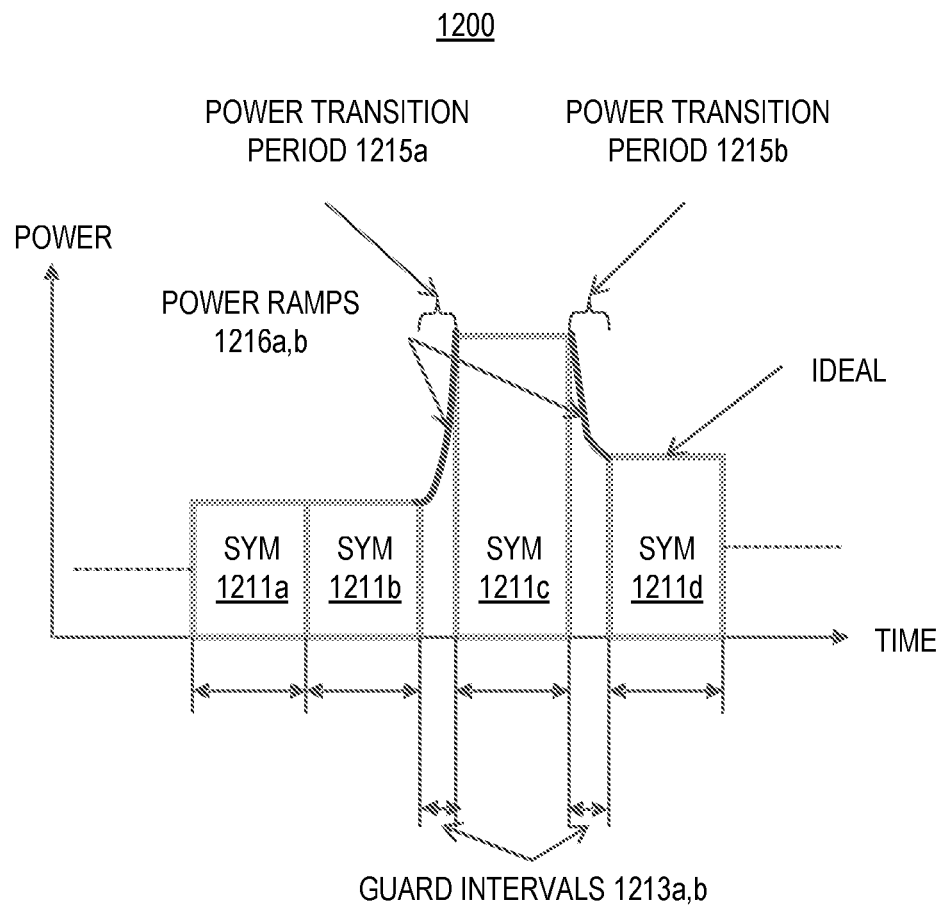
FIG. 12 illustrates another embodiment of a method for providing a guard interval for transmissions in a communication system in accordance with various aspects as described herein.

In another embodiment, a guard interval may be introduced before the SRS symbol, after the SRS symbol, or both. Each guard interval may be used to cover all or any portion of the corresponding power ramp that occurs if power changes between the SRS symbol and the corresponding data symbol. For example, FIG. 12 illustrates another embodiment of a method 1200 for providing guard intervals 1213a,b for transmissions in a communication system in accordance with various aspects as described herein. In FIG. 12, symbols 1211a-d may be transmitted in the wireless communication system. Further, the guard intervals 1213a,b are introduced to cover all or a portion of corresponding power ramps 1216a,b over respective power transition periods 1215a,b between the symbol 1211c (e.g., SRS symbol) and the respective adjacent symbols 1211b,d (e.g., data symbols). Further, the power ramps 1216a,b often have exponential-decay-like behavior (i.e., transients in the power ramp slowly decay).

The time for the guard interval may be provided in various ways. In one embodiment, the frame structure may provide time for guard intervals. For example, for a subframe having duration $T_{sf}$ and containing N symbols with duration $T_{symb}$, if a length of N symbols is less than a length of the subframe, then a guard interval duration may be introduced that meets the following relationship: $T_{sf}=N \cdot T_{symb}+T_{gi}$, with $T_{gi}$ being the guard interval duration. This guard interval duration may be distributed before the SRS symbol, after the SRS symbol, or both, as one or more guard intervals. Further, parts of this guard interval duration may be used for other purposes (e.g. guard intervals for UL/DL switching in TDD systems).

Figure 13:
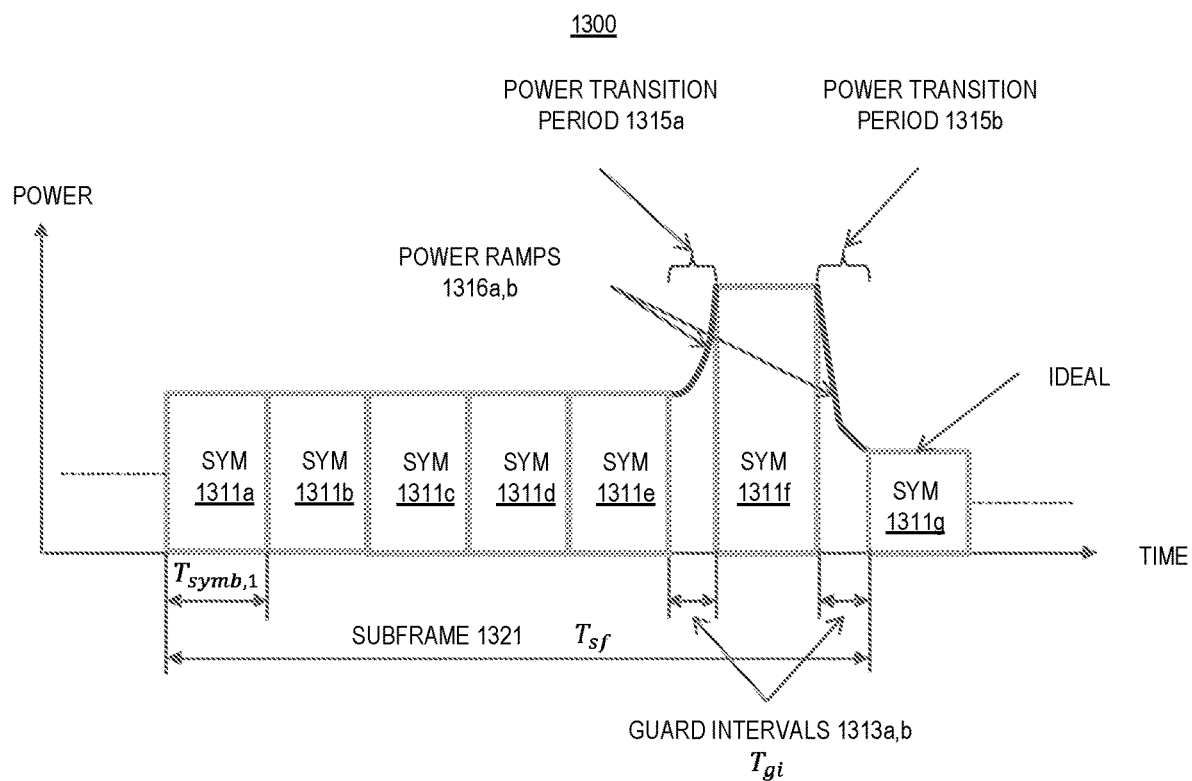
FIG. 13 illustrates another embodiment of a method for providing a guard interval for transmissions in a communication system in accordance with various aspects as described herein

In another embodiment, the subframe duration may be equivalent to an integer number of different types of symbols. For instance, the subframe duration ($T_{sf}$) may be provided as follows:

$$T_{sf}=N \cdot T_{symb,1}+M \cdot T_{symb,2},$$

with N and M being the number of respective first and second types of symbols and $T_{symb,1}$ and $T_{symb,2}$ being the symbol durations of the respective first and second types of symbols. While only two types of symbols are provided in this example, other types of symbols may be included. In one example, the duration of the first type of symbol ($T_{symb,1}$) may correspond to the symbol duration of a first type of OFDM symbol (e.g., subcarrier bandwidth $\Delta F_1$, CP1 if present) and the duration of the second type of symbol ($T_{symb,2}$) may correspond to the symbol duration of a second type of OFDM symbol (e.g., subcarrier bandwidth $\Delta F_2$, CP2 if present). The subcarrier bandwidth may relate to each other via $\Delta F_2=m/n\ \Delta F_1$ with integers m and n (e.g., m or n may be one). A subframe may contain only symbols of one type (i.e., M=0.) For example, FIG. 13 illustrates another embodiment of a method 1300 for providing a guard interval 1313a,b for transmissions in a communication system in accordance with various aspects as described herein. In FIG. 13, a subframe 1321 includes symbols of one type 1311a-f. A next subframe includes symbol 1311g of the same type. The guard intervals 1313a,b may be introduced to cover all or a portion of corresponding power ramps 1316a,b over respective power transition periods 1315a,b between the symbol 1311f (e.g., SRS symbol) and the respective adjacent symbols 1311e,g (e.g., data symbols). The guard interval duration may then correspond to the symbol duration of one or multiple symbol durations (e.g., $T_{gi}=L \cdot T_{symb,1}$). L is the number (or fraction) of symbols (e.g., OFDM symbols) of duration $T_{symb,1}$ that are needed to generate a guard interval duration of $T_{gi}$. For instance, following the LTE example of 20 µsec. transient period, if $T_{gi}=20$ µsec. and $T_{symb,1}=10$ µsec., then L=2 symbols may be reserved for the guard interval. While the guard interval duration may be distributed before or after the symbol 1311f (e.g., SRS symbol) as guard interval(s) 1313a,b, the guard interval duration may also be used for other purposes (e.g., SRS symbol in the last symbol of a subframe).

Figure 14:
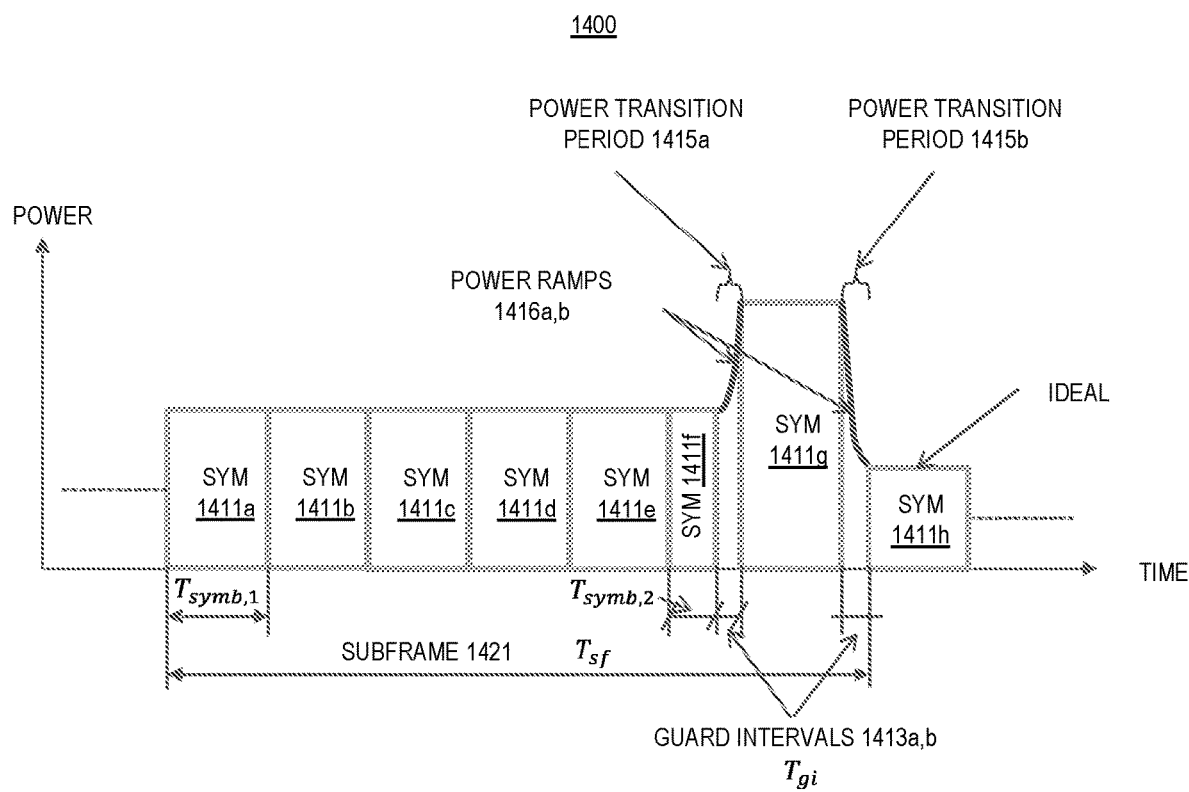
FIG. 14 illustrates another embodiment of a method for providing a guard interval for transmissions in a communication system in accordance with various aspects as described herein

If a subframe contains symbol durations with different lengths, then the guard interval may have length $T_{gi}=L_1 \cdot T_{symb,1}+L_2 \cdot T_{symb,2}$, or if only composed of symbol durations of one length it may be $T_{gi}=L_1 \cdot T_{symb,1}$ or $T_{gi}=L_2 \cdot T_{symb,2}$. In one example, if $T_{symb,1}=10$ µsec. and $T_{symb,1}=5$ µsec., then to achieve $T_{gi}=20$ µsec., either (i) $L_1=1$ and $L_2=2$, (ii) $L_1=2$, or (iii) $L_2=4$. A duration of a subframe may be $T_{sf}=(N+1)T_{symb,1}$ and the extra symbol duration $T_{symb,1}$ may be split into two symbol durations of half length (i.e., $T_{sf}=N \cdot T_{symb,1}+2 \cdot T_{symb,2}$ with $T_{symb,2}=T_{symb,1}/2$). For example, FIG. 14 illustrates another embodiment of a method 1400 for providing a guard interval 1413a,b for transmissions in a communication system in accordance with various aspects as described herein. In FIG. 14, a subframe 1421 may include symbols 1411a-g. A next subframe may include symbol 1411h. The guard intervals 1413a,b may be introduced to cover all or a portion of corresponding power ramps 1416a,b over respective power transition periods 1415a,b between the symbol 1411g (e.g., SRS symbol) and the respective adjacent symbols 1411f,h (e.g., data symbols). One of the shorter symbols 1411f may be used for data and the duration of the second shorter symbol may be used for the guard intervals 1413a,b having duration $T_{gi}$. As before, $T_{gi}$ may be distributed before and/or after the symbol 1411g (e.g., SRS symbol) as guard interval (s) 1413a,b and any remaining parts (i.e., any difference between the duration of the subframe 1421 and the combined durations of the symbols 1411a-h and the guard intervals 1413a,b) may be used for other purposes.

Figure 15:
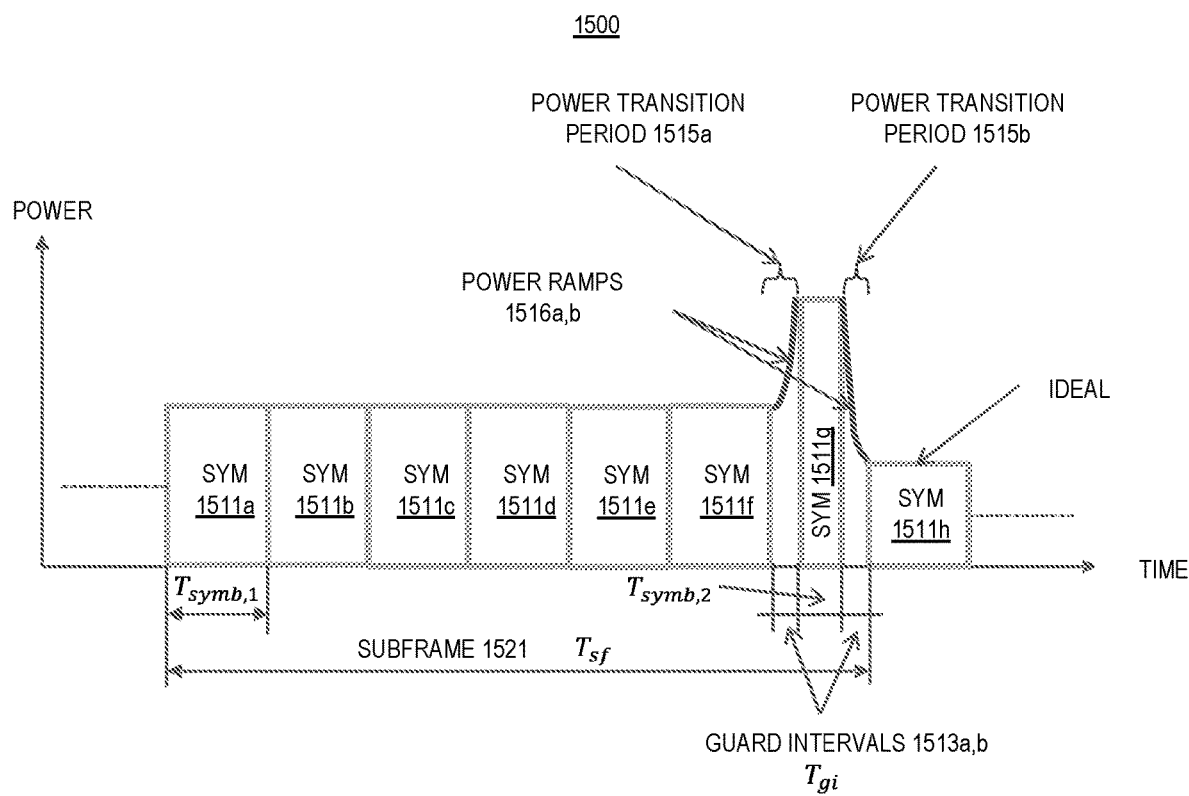
FIG. 15 illustrates another embodiment of a method for providing a guard interval for transmissions in a communication system in accordance with various aspects as described herein

In another example, FIG. 15 illustrates another embodiment of a method 1500 for providing a guard interval 1513a,b for transmissions in a communication system in accordance with various aspects as described herein. In FIG. 15, a subframe 1521 may include symbols 1511a-g. A next subframe may include symbol 1511h. The guard intervals 1513a,b may be introduced to cover all or a portion of corresponding power ramps 1516a,b over respective power transition periods 1515a,b between the symbol 1511g (e.g., SRS symbol) and the respective adjacent symbols 1511f,h (e.g., data symbols). The symbols 1511a-f,h may be $T_{symb,1}$ long and the symbol 1511g may be $T_{symb,2}$ long. The guard interval duration may be as long as before and may be used in the same manner.

The examples of FIGS. 14-15 are restricted to the case $T_{symb,2}=T_{symb,1}/2$. This case may be extended to a more general relationship such as $T_{symb,2}=n/m\ T_{symb,1}$, or when the guard interval spans multiple symbols having the same or different durations.

In FIGS. 14-15, a duration of each respective subframe 1421, 1521 corresponds to N=6 symbol durations of $T_{symb,1}$ and M=2 symbol durations of $T_{symb,2}$. In FIG. 14, the symbol 1411g (e.g., SRS symbol) is a duration of the first type of symbol ($T_{symb,1}$) with one of the data symbols 1411f having a duration of the second type of symbol ($T_{symb,2}$) and the guard interval duration being equivalent to the duration of the second type of symbol ($T_{gi}=T_{symb,2}$) and distributed before and after the symbol 1411g as guard intervals 1413a, b. In FIG. 15, the symbol 1511g (e.g., SRS symbol) has a duration of the second type of symbol ($T_{symb,2}$) and a guard interval duration being equivalent to a duration of the second type of symbol ($T_{gi}=T_{symb,2}$) and is distributed before and after the symbol 1511g as guard intervals 1513a,b.

In another embodiment, if the symbols are OFDM symbols, such symbols may have a CP. The CP may be a copy of the last portion of an OFDM symbol, which may simplify equalization in an OFDM system. The CP may be at least as long as the delay spread of the channel, with a short CP possibly impairing reception quality. The transmission of SRS symbols by UEs may be used by an eNB to estimate the channel in the UL. Further, if the eNB implementation is reciprocal, the eNB may use this channel estimate to calculate precoder weights for DL transmissions to a corresponding UE. A sufficiently long CP may be important for good channel estimation quality. If the SRS symbols are used in a Multiple Input Multiple Output (MIMO) system and pilot contamination becomes performance limiting, a longer CP may be required since SRS symbols transmitted from UEs in second-tier neighboring cells should remain orthogonal and should be received within the CP.

Figure 16:
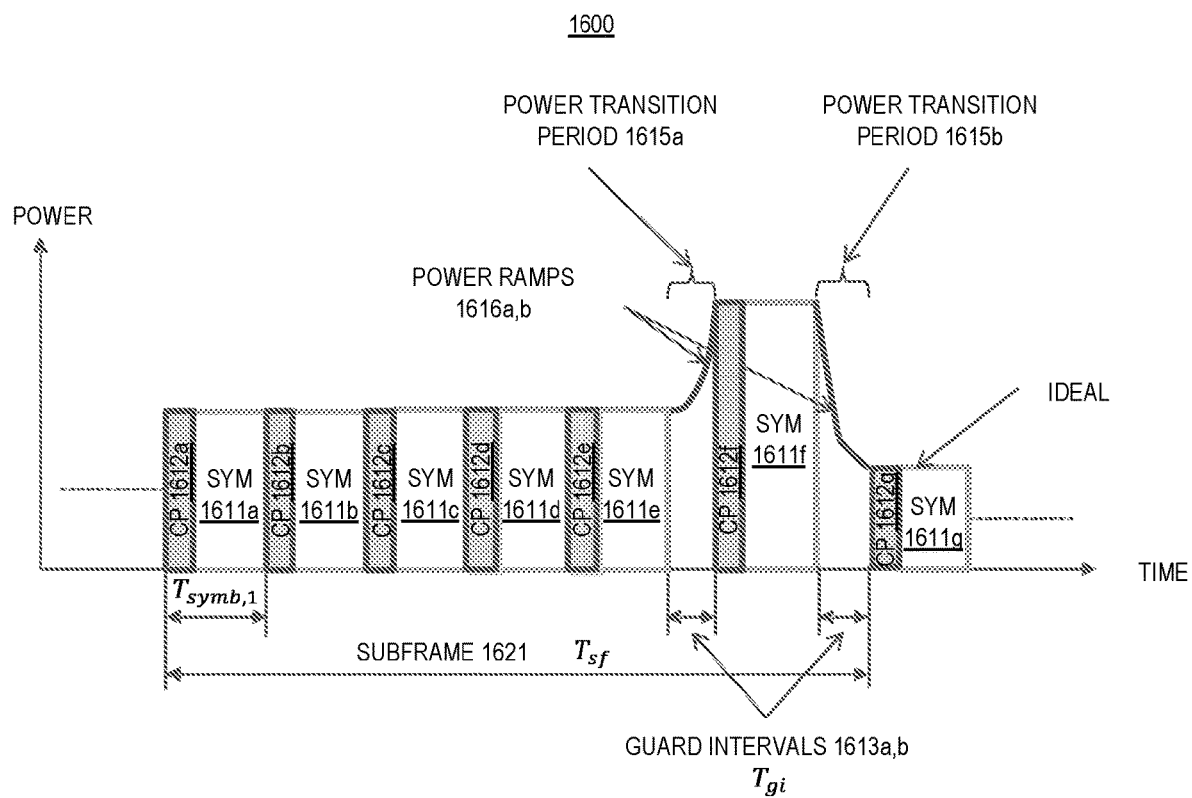
FIG. 16 illustrates another embodiment of a method for providing a guard interval for transmissions in a communication system in accordance with various aspects as described herein

In another embodiment, a portion of the guard interval duration ($T_{gi}$) may be used to extend the CP by that portion. For example, FIG. 16 illustrates another embodiment of a method 1600 for providing a guard interval 1613a,b for transmissions in a communication system in accordance with various aspects as described herein. FIG. 16 is similar to FIG. 14 except a CP 1612a-g is shown for each symbol 1611a-g. In FIG. 16, a subframe 1621 may include symbols 1611a-f. A next subframe may include symbol 1611g. The guard intervals 1613a,b may be introduced to cover all or a portion of corresponding power ramps 1616a,b over respective power transition periods 1615a,b between the symbol 1611f (e.g., SRS symbol) and the respective adjacent symbols 1611e,g (e.g., data symbols).

Figure 17:
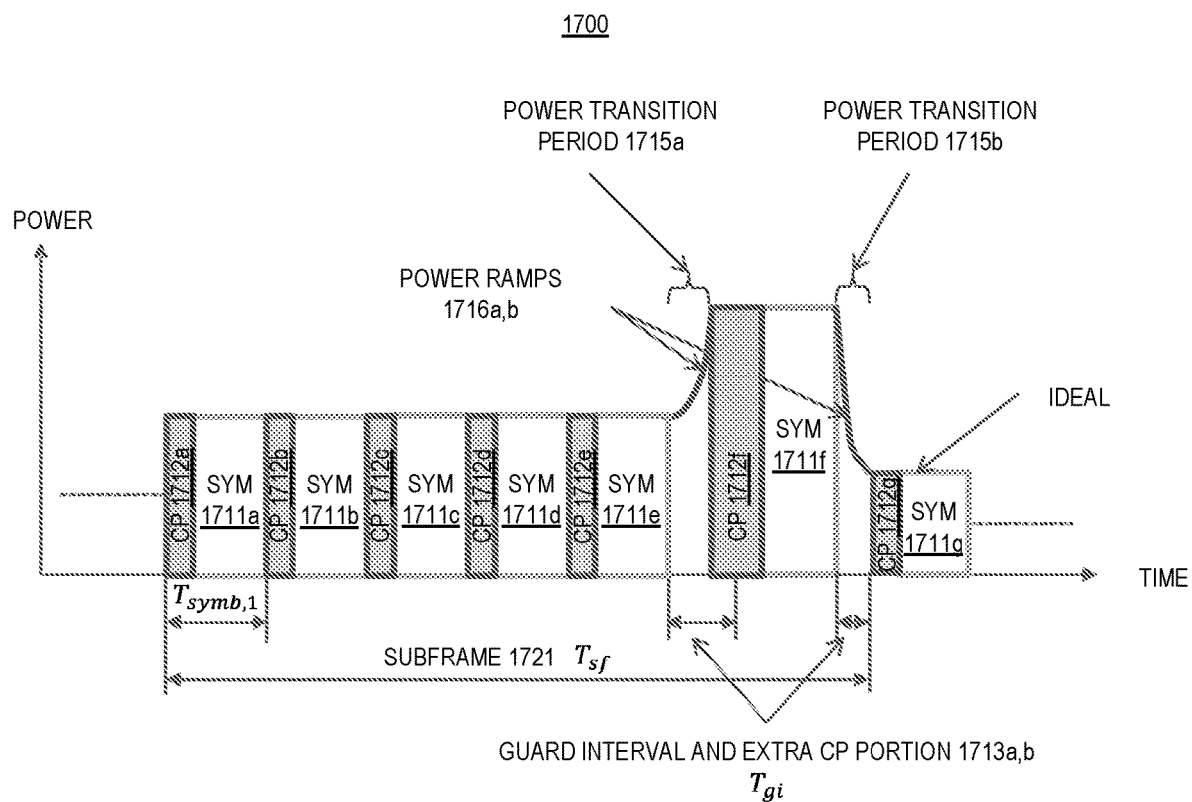
FIG. 17 illustrates another embodiment of a method for providing a guard interval for transmissions in a communication system in accordance with various aspects as described herein

In another embodiment, the CP of one of the symbols (e.g., SRS symbol) may be extended by reducing the guard interval. For example, FIG. 17 illustrates another embodiment of a method 1700 for providing a guard interval 1713a,b for transmissions in a communication system in accordance with various aspects as described herein. In FIG. 17, a subframe 1721 may include symbols 1711a-f. A next subframe may include symbol 1711g. The guard intervals 1713a,b may be introduced to cover all or a portion of corresponding power ramps 1716a,b over respective power transition periods 1715a,b between the symbol 1711f (e.g., SRS symbol) and the respective adjacent symbols 1711e,g (e.g., data symbols). A CP 1712a-g is shown for each corresponding symbol 1711a-g. Further, portions of the guard interval duration ($T_{gi}$) may be used to extend the CP 1712f of the symbol 1711f (e.g., SRS symbol), with the guard interval duration reduced accordingly. This may be useful if the guard interval duration ($T_{gi}$) is longer than needed to cover the power ramp durations 1715a,b. In this case, the excess time duration may be used to extend the CP 1712f. In conventional applications, the guard interval duration may be based on a full or half symbol duration since this may allow a guard interval that fits into a subframe or frame structure. However, this approach may result in a guard interval with a duration that is longer than required or preferred. Accordingly, as described herein, the use of a portion of the guard interval duration to extend the CP of the corresponding symbol while providing a duration of the resulting guard interval sufficient to cover the power ramp duration may result in the same or similar performance as that of the conventional applications.

In another embodiment, an OFDM system may use a unique word instead of a CP. The CP may be replaced by a known signal. Further, the length of the unique word of the corresponding symbol (e.g., SRS symbol) may be extended in the same way as shown in FIG. 17.

In another embodiment, an OFDM system may use a guard period (e.g., interval of zero-valued signal) instead of a CP. For instance, a zero-valued signal may be used to mitigate intersymbol interference (ISI) from one or more previous symbols. Further, the guard period may be extended in the same way as shown in FIG. 17 (i.e., portions of $T_{gi}$ may be used as a guard period for a corresponding symbol).

In another embodiment, an eNB may be or become aware of a guard interval when an SRS symbol is transmitted so that it may receive data and SRS symbols correctly. For instance, if there is always a guard interval when the SRS symbol is transmitted, then the eNB may receive the data and SRS symbols correctly based on the guard interval. If the guard interval is sometimes inserted when the SRS symbol is transmitted, then the eNB and UE must assume the same frame or subframe structure. The format selection of the frame or subframe structure may be signaled from the eNB to the UE (e.g., in uplink grant L1/L2 control signaling (PDCCH) or via higher layer signaling (RRC)). The format selection may also be based implicitly on other parameters such as no guard interval(s) are inserted if the power, bandwidth or PSD of the data and SRS symbols are the same or substantially similar (i.e., within a certain range such as 10% or 1 dB). Otherwise, the guard intervals are inserted.

In one embodiment, a method by a wireless device in a wireless communication system includes generating a transmit signal comprising a series of symbols, including a pair of consecutive symbols that are to be transmitted at different power levels, with power ramping to occur over a power transition period between the consecutive symbols. Further, the method includes transmitting the transmit signal with a guard interval overlapping at least partly with the power transition period.

In another embodiment, the method may further include transmitting the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the method may further include transmitting the series of symbols within a subframe that comprises two or more symbol periods, with at least two symbol periods having different durations. Further, a duration of the guard interval may equal one of the different symbol period durations.

In another embodiment, the method may further include transmitting the series of symbols within a subframe that comprises two or more symbol periods, with at least two symbol periods having different durations. Further, a duration of the guard interval may be a function of the different symbol period durations.

In another embodiment, the method may further include transmitting the series of symbols within a subframe that comprises two or more symbol periods. Each symbol period in the subframe may have the same duration. Further, a duration of the guard interval may equal an integer multiple of the symbol period duration. Also, this integer multiple may be an integer with a value greater than or equal to one.

In another embodiment, the symbols may be OFDM symbols. Each OFDM symbol may have a first or a second CP. Further, a duration of the second CP may be equivalent to a duration of the first CP and an extended duration. Also, a duration of the guard interval plus the extended duration of the second CP may equal a predetermined duration.

In another embodiment, the symbols may be OFDM symbols. Each OFDM symbol may include a first or second predetermined signal. A duration of the second predetermined signal may be equivalent to a duration of the first predetermined signal and an extended duration. Also, a duration of the guard interval plus the extended duration of the second predetermined signal may equal a predetermined duration.

In another embodiment, each of the first and second predetermined signals may be a zero-valued signal.

In another embodiment, the predetermined duration may be at least one of (1) a difference between a duration of the subframe and a collective duration of the symbol periods in the subframe, (2) one of different symbol period durations in the subframe, (3) a duration defined as a function of different symbol period durations in the subframe, and (4) an integer multiple of a symbol period duration.

In another embodiment, the method may further include receiving, by the wireless device, from a network node in the wireless communication system, an indication of whether to use the first or second predetermined signal.

In another embodiment, the method may further include receiving, by the wireless device, from a network node in the wireless communication system, an indication of whether the transmit signal is to be transmitted with the guard interval. Further, the method may include determining whether to transmit the transmit signal with the guard interval responsive to the indication.

In another embodiment, the method may further include determining whether to transmit the transmit signal with the guard interval based on a difference of power levels between the consecutive symbols. In one example, the method may include determining to transmit the transmit signal with the guard interval responsive to an relative difference of power levels between the consecutive symbols being at least a certain threshold (e.g., 20% or 3 dB). In another example, the method may include determining to transmit the transmit signal with the guard interval responsive to either an increase of power levels between the consecutive symbols being at least a certain first threshold (e.g., 10% or 1 dB) or a decrease of power levels between consecutive symbols being at least a certain second threshold (−20% or −3 dB).

In another embodiment, the method may further include determining whether to transmit the transmit signal with the guard interval based on a difference of bandwidth between the consecutive symbols. In one example, the method may include determining to transmit the transmit signal with the guard interval responsive to an relative difference of bandwidth between the consecutive symbols being at least a certain threshold (e.g., 10%, or 20%, or 50%). In another example, the method may include determining to transmit the transmit signal with the guard interval responsive to either an increase of bandwidth between the consecutive symbols being at least a certain first threshold (e.g., 10%) or a decrease of bandwidth between the consecutive symbols being at least a certain second threshold (e.g., −20%).

In another embodiment, the method may further include determining whether to transmit the transmit signal with the guard interval based on a difference of PSD between the consecutive symbols. In one example, the method may include determining to transmit the transmit signal with the guard interval responsive to an relative difference of PSD between the consecutive symbols being at least a certain threshold (e.g., 20% or 3 dB). In another example, the method may include determining to transmit the transmit signal with the guard interval responsive to either an increase of PSD between the consecutive symbols being at least a certain first threshold (e.g., 10% or 1 dB) or a decrease of PSD between consecutive symbols being at least a certain second threshold (e.g. −20% or −3 dB).

In another embodiment, the guard interval may include a contiguous interval between the consecutive symbols.

In another embodiment, the guard interval may include a non-contiguous interval distributed before and after one of the consecutive symbols.

In another embodiment, the guard interval may include a non-contiguous interval, part of which overlaps at least partly with said power transition period and part of which overlaps at least partly with a power transition period between a different pair of symbols in the series.

In another embodiment, the non-contiguous interval may be asymmetrically distributed or symmetrically distributed.

In another embodiment, the consecutive symbols may span different frequency bandwidths.

In another embodiment, the consecutive symbols may include a data symbol that conveys data and a reference symbol that conveys a reference signal.

In another embodiment, the wireless communication system may be based on an LTE system, and the data may include PUSCH data and the reference signal may be an SRS signal.

In one embodiment, a wireless device is configured to generate a transmit signal comprising a series of symbols, including a pair of consecutive symbols that are to be transmitted at different power levels, with power ramping to occur over a power transition period between the consecutive symbols. The wireless device is further configured to transmit the transmit signal with a guard interval overlapping at least partly with the power transition period.

In another embodiment, the wireless device may be further configured to transmit the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the wireless device may be further configured to transmit the series of symbols within a subframe that comprises two or more symbol periods, with at least two symbol periods having different durations. Further, a duration of the guard interval may equal one of the different symbol period durations.

In another embodiment, the wireless device may be further configured to transmit the series of symbols within a subframe that comprises two or more symbol periods, with at least two symbol periods having different durations. Further, a duration of the guard interval may be a function of the different symbol period durations.

In another embodiment, the wireless device may be further configured to transmit the series of symbols within a subframe that comprises two or more symbol periods. Each symbol period in the subframe may have the same duration. Further, a duration of the guard interval may equal an integer multiple of the symbol period duration. Also, this integer multiple may be an integer with a value greater than or equal to one.

In another embodiment, the wireless device may be further configured to receive, from a network node in the wireless communication system, an indication of whether to use the first or second predetermined signal.

In another embodiment, the wireless device may be further configured to receive, from a network node in the wireless communication system, an indication of whether the transmit signal is to be transmitted with the guard interval. Further, the wireless device may be further configured to determine whether to transmit the transmit signal with the guard interval responsive to the indication.

In another embodiment, the wireless device may be further configured to determine whether to transmit the transmit signal with the guard interval based on a difference of power levels between the consecutive symbols.

In another embodiment, the wireless device may be further configured to determine whether to transmit the transmit signal with the guard interval based on a difference of bandwidth between the consecutive symbols.

In another embodiment, the wireless device may be further configured to determine whether to transmit the transmit signal with the guard interval based on a difference of PSD between the consecutive symbols.

In one embodiment, a wireless device includes means for generating a transmit signal comprising a series of symbols, including a pair of consecutive symbols that are to be transmitted at different power levels, with power ramping to occur over a power transition period between the consecutive symbols. Further, the wireless device includes means for transmitting the transmit signal with a guard interval overlapping at least partly with the power transition period.

In another embodiment, the wireless device may further include means for transmitting the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the wireless device may further include means for transmitting the series of symbols within a subframe that comprises two or more symbol periods, with at least two symbol periods having different durations. Further, a duration of the guard interval may equal one of the different symbol period durations.

In another embodiment, the wireless device may further include means for transmitting the series of symbols within a subframe that comprises two or more symbol periods, with at least two symbol periods having different durations. Further, a duration of the guard interval may be a function of the different symbol period durations.

In another embodiment, the wireless device may further include means for transmitting the series of symbols within a subframe that comprises two or more symbol periods. Each symbol period in the subframe may have the same duration. Further, a duration of the guard interval may equal an integer multiple of the symbol period duration. Also, this integer multiple may be an integer with a value greater than or equal to one.

In another embodiment, the wireless device may further include means for receiving, from a network node in the wireless communication system, an indication of whether to use the first or second predetermined signal.

In another embodiment, the wireless device may further include means for receiving, from a network node in the wireless communication system, an indication of whether the transmit signal is to be transmitted with the guard interval. Further, the wireless device may include means to determine whether to transmit the transmit signal with the guard interval responsive to the indication.

In another embodiment, the wireless device may further include means for determining whether to transmit the transmit signal with the guard interval based on a difference of power levels between the consecutive symbols.

In another embodiment, the wireless device may further include means for determining whether to transmit the transmit signal with the guard interval based on a difference of bandwidth between the consecutive symbols.

In another embodiment, the wireless device may further include means for determining whether to transmit the transmit signal with the guard interval based on a difference of PSD between the consecutive symbols.

In one embodiment, a computer program comprises instructions which, when executed by at least one processor of a wireless device, causes the wireless device to generate a transmit signal comprising a series of symbols, including a pair of consecutive symbols that are to be transmitted at different power levels, with power ramping to occur over a power transition period between the consecutive symbols. The computer program further comprises instructions which, when executed by the at least one processor of the wireless device, causes the wireless device to transmit the transmit signal with a guard interval overlapping at least partly with the power transition period.

In another embodiment, the computer program may further cause the wireless device to transmit the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the computer program may further cause the wireless device to transmit the series of symbols within a subframe that comprises two or more symbol periods, with at least two symbol periods having different durations. Further, a duration of the guard interval may equal one of the different symbol period durations.

In another embodiment, the computer program may further cause the wireless device to transmit the series of symbols within a subframe that comprises two or more symbol periods, with at least two symbol periods having different durations. Further, a duration of the guard interval may be a function of the different symbol period durations.

In another embodiment, the computer program may further cause the wireless device to transmit the series of symbols within a subframe that comprises two or more symbol periods. Each symbol period in the subframe may have the same duration. Further, a duration of the guard interval may equal an integer multiple of the symbol period duration. Also, this integer multiple may be an integer with a value greater than or equal to one.

In another embodiment, the computer program may further cause the wireless device to receive, from a network node in the wireless communication system, an indication of whether to use the first or second predetermined signal.

In another embodiment, the computer program may further cause the wireless device to receive, from a network node in the wireless communication system, an indication of whether the transmit signal is to be transmitted with the guard interval. The computer program may further cause the wireless device to determine whether to transmit the transmit signal with the guard interval responsive to the indication.

In another embodiment, the computer program may further cause the wireless device to determine whether to transmit the transmit signal with the guard interval based on a difference of power levels between the consecutive symbols.

In another embodiment, the computer program may further cause the wireless device to determine whether to transmit the transmit signal with the guard interval based on a difference of bandwidth between the consecutive symbols.

In another embodiment, the computer program may further cause the wireless device to determine whether to transmit the transmit signal with the guard interval based on a difference of PSD between the consecutive symbols.

In another embodiment, a carrier may contain the computer program. Further, the carrier may be one of an electronic signal, optical signal, radio signal, or computer readable storage medium.

In one embodiment, a method by a network node in a wireless communication system includes receiving a signal having a series of symbols and with a guard interval overlapping at least partly with a power transition period. Further, the method includes obtaining the series of symbols from the received signal, including a pair of consecutive symbols transmitted at different power levels, with power ramping occurring over the power transition period between the consecutive symbols.

In another embodiment, the step of receiving the signal may include receiving the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the step of receiving the signal may include receiving the series of symbols within a subframe that comprises two or more symbol periods, with at least two symbol periods having different durations. Further, a duration of the guard interval may equal one of the different symbol period durations.

In another embodiment, the step of receiving the signal may include receiving the series of symbols within a subframe that comprises two or more symbol periods, with at least two symbol periods having different durations. Further, a duration of the guard interval may be a function of the different symbol period durations.

In another embodiment, the step of receiving the signal may include receiving the series of symbols within a subframe that comprises two or more symbol periods. Each symbol period in the subframe may have the same duration. Further, a duration of the guard interval may equal an integer multiple of the symbol period duration. The integer multiple may be an integer with a value greater than or equal to one.

In another embodiment, the symbols may be OFDM symbols. Each OFDM symbol may include a first or a second CP. Further, a duration of the second CP may be equivalent to a duration of the first CP and an extended duration. Also, a duration of the guard interval plus the extended duration of the second CP may equal a predetermined duration.

In another embodiment, the symbols may be OFDM symbols. Each OFDM symbol may include a first or second predetermined signal. Further, a duration of the second predetermined signal may be equivalent to a duration of the first predetermined signal and an extended duration. Also, a duration of the guard interval plus the extended duration of the second predetermined signal may equal a predetermined duration.

In another embodiment, each of the first and second predetermined signals may be a zero-valued signal.

In another embodiment, the predetermined duration may be at least one of (1) a difference between a duration of the subframe and a collective duration of the symbol periods in the subframe, (2) one of different symbol period durations in the subframe, (3) a duration defined as a function of different symbol period durations in the subframe, and (4) an integer multiple of a symbol period duration.

In another embodiment, the method may further include transmitting, by the network node, to a wireless device in the wireless communication system, an indication of whether to use the first or second predetermined signal.

In another embodiment, the method may further include transmitting, by the network node, to the wireless device, an indication that the wireless device is to transmit the signal with the guard interval responsive to determining that the wireless device in the wireless communication system is to transmit the signal with the guard interval.

In another embodiment, the step of determining that the wireless device in the wireless communication system is to transmit the signal with the guard interval may be based on a difference of power levels between the consecutive symbols.

In another embodiment, the step of determining that the wireless device in the wireless communication system is to transmit the signal with the guard interval may be based on a difference of bandwidth between the consecutive symbols.

In another embodiment, the step of determining that the wireless device in the wireless communication system is to transmit the signal with the guard interval may be based on a difference of PSD between the consecutive symbols.

In another embodiment, the guard interval may include a contiguous interval between the consecutive symbols.

In another embodiment, the guard interval may include a non-contiguous interval distributed before and after one of the consecutive symbols.

In another embodiment, the guard interval may include a non-contiguous interval, part of which overlaps at least partly with said power transition period and part of which overlaps at least partly with a power transition period between a different pair of symbols in the series.

In another embodiment, the non-contiguous interval may be asymmetrically distributed.

In another embodiment, the non-contiguous interval may be symmetrically distributed.

In another embodiment, the consecutive symbols may span different frequency bandwidths.

In another embodiment, the consecutive symbols may include a data symbol that conveys user data and a reference symbol that conveys a reference signal.

In another embodiment, the wireless communication system may be based on an LTE system. Further, the user data may include PUSCH data and the reference signal may be an SRS signal.

In one embodiment, a network node is configured to receive a signal having a series of symbols and with a guard interval overlapping at least partly with a power transition period. The network node is further configured to obtain the series of symbols from the received signal, including a pair of consecutive symbols transmitted at different power levels, with power ramping occurring over the power transition period between the consecutive symbols.

In another embodiment, the network node may be further configured to receive the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the network node may be further configured to receive the series of symbols within a subframe that includes two or more symbol periods, with at least two symbol periods having different durations. Further, a duration of the guard interval may equal one of the different symbol period durations.

In another embodiment, the network node may be further configured to receive the series of symbols within a subframe that includes two or more symbol periods, with at least two symbol periods having different durations. Further, a duration of the guard interval may be a function of the different symbol period durations.

In another embodiment, the network node may be further configured to receive the series of symbols within a subframe that includes two or more symbol periods. Each symbol period in the subframe may have the same duration. Further, a duration of the guard interval may equal an integer multiple of the symbol period duration. The integer multiple may be an integer with a value greater than or equal to one.

In another embodiment, the network node may be further configured to transmit, to a wireless device in the wireless communication system, an indication of whether to use the first or second predetermined signal.

In another embodiment, the network node may be further configured to determine whether a wireless device in the wireless communication system is to transmit the signal with the guard interval.

In another embodiment, the network node may be further configured to transmit, to the wireless device, an indication that the wireless device is to transmit the signal with the guard interval responsive to determining that the wireless device in the wireless communication system is to transmit the signal with the guard interval.

In another embodiment, the network node may be further configured to determine whether a wireless device in the wireless communication system is to transmit the signal with the guard interval based on a difference of power levels between the consecutive symbols.

In another embodiment, the network node may be further configured to determine whether a wireless device in the wireless communication system is to transmit the signal with the guard interval based on a difference of bandwidth between the consecutive symbols.

In another embodiment, the network node may be further configured to determine whether a wireless device in the wireless communication system is to transmit the signal with the guard interval based on a difference of PSD between the consecutive symbols.

In one embodiment, a network node includes means for receiving a signal having a series of symbols and with a guard interval overlapping at least partly with a power transition period. Further, the network node includes means for obtaining the series of symbols from the received signal, including a pair of consecutive symbols transmitted at different power levels, with power ramping occurring over the power transition period between the consecutive symbols.

In another embodiment, the network node may further include means for receiving the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the network node may further include means for receiving the series of symbols within a subframe that includes two or more symbol periods, with at least two symbol periods having different durations. Further, a duration of the guard interval may equal one of the different symbol period durations.

In another embodiment, the network node may further include means for receiving the series of symbols within a subframe that includes two or more symbol periods, with at least two symbol periods having different durations. Further, a duration of the guard interval may be a function of the different symbol period durations.

In another embodiment, the network node may further include means for receiving the series of symbols within a subframe that includes two or more symbol periods. Each symbol period in the subframe may have the same duration. Further, a duration of the guard interval may equal an integer multiple of the symbol period duration. The integer multiple may be an integer with a value greater than or equal to one.

In another embodiment, the network node may further include means for transmitting, to a wireless device in the wireless communication system, an indication of whether to use the first or second predetermined signal.

In another embodiment, the network node may further include means for determining whether a wireless device in the wireless communication system is to transmit the signal with the guard interval.

In another embodiment, the network node may further include means for transmitting, to the wireless device, an indication that the wireless device is to transmit the signal with the guard interval responsive to determining that the wireless device in the wireless communication system is to transmit the signal with the guard interval.

In another embodiment, the network node may further include means for determining whether a wireless device in the wireless communication system is to transmit the signal with the guard interval based on a difference of power levels between the consecutive symbols.

In another embodiment, the network node may further include means for determining whether a wireless device in the wireless communication system is to transmit the signal with the guard interval based on a difference of bandwidth between the consecutive symbols.

In another embodiment, the network node may further include means for determining whether a wireless device in the wireless communication system is to transmit the signal with the guard interval based on a difference of PSD between the consecutive symbols.

In one embodiment, a computer program includes instructions which, when executed by at least one processor of a network node, causes the network node to receive a signal having a series of symbols and with a guard interval overlapping at least partly with a power transition period. The computer program further includes instructions which, when executed by the at least one processor of the network node causes the network node to obtain the series of symbols from the received signal, including a pair of consecutive symbols transmitted at different power levels, with power ramping occurring over the power transition period between the consecutive symbols.

In another embodiment, the computer program may further cause the network node to receive the series of symbols within a subframe that comprises one or more symbol periods. Each symbol period in the subframe may have the same duration. Further, a duration of the subframe may be greater than a collective duration of the symbol periods in the subframe. Also, a duration of the guard interval may be at least a portion of a difference between the duration of the subframe and the collective duration of the symbol periods in the subframe.

In another embodiment, the computer program may further cause the network node to receive the series of symbols within a subframe that includes two or more symbol periods, with at least two symbol periods having different durations. Further, a duration of the guard interval may equal one of the different symbol period durations.

In another embodiment, the computer program may further cause the network node to receive the series of symbols within a subframe that includes two or more symbol periods, with at least two symbol periods having different durations. Further, a duration of the guard interval may be a function of the different symbol period durations.

In another embodiment, the computer program may further cause the network node to receive the series of symbols within a subframe that includes two or more symbol periods. Each symbol period in the subframe may have the same duration. Further, a duration of the guard interval may equal an integer multiple of the symbol period duration. The integer multiple may be an integer with a value greater than or equal to one.

In another embodiment, the computer program may further cause the network node to transmit, to a wireless device in the wireless communication system, an indication of whether to use the first or second predetermined signal.

In another embodiment, the computer program may further cause the network node to determine whether a wireless device in the wireless communication system is to transmit the signal with the guard interval.

In another embodiment, the computer program may further cause the network node to transmit, to the wireless device, an indication that the wireless device is to transmit the signal with the guard interval responsive to determining that a wireless device in the wireless communication system is to transmit the signal with the guard interval.

In another embodiment, the computer program may further cause the network node to determine whether a wireless device in the wireless communication system is to transmit the signal with the guard interval based on a difference of power levels between the consecutive symbols.

In another embodiment, the computer program may further cause the network node to determine whether a wireless device in the wireless communication system is to transmit the signal with the guard interval based on a difference of bandwidth between the consecutive symbols.

In another embodiment, the computer program may further cause the network node to determine whether a wireless device in the wireless communication system is to transmit the signal with the guard interval based on a difference of PSD between the consecutive symbols.

In another embodiment, a carrier containing the computer program is one of an electronic signal, optical signal, radio signal, or computer readable storage medium.

Abbreviations:

| Abbreviation | Explanation |
| --- | --- |
| 3GPP | $3^{rd}$ Generation Partnership Project |
| BS | Base Station |
| CP | Cyclic Prefix |
| CRC | Cyclic Redundancy Check |
| CRS | Cell Specific Reference Signal |
| CSI | Channel State Information |
| CSS | Common Search Space |
| DL | Downlink |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| FDD | Frequency Division Duplex |
| IFFT | Inverse Fast Fourier Transform |
| IoT | Internet of Things |
| LTE | Long Term Evolution |
| MIMO | Multiple Input Multiple Output |
| MSR | Multi-Standard Radio |
| MTC | Machine-Type Communication |
| NB | Narrow-Band |
| NB-IoT | Narrow-Band Internet of Things |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PDCCH | Physical Data Control Channel |
| PRACH | Physical Random Access Channel |
| PRB | Physical Resource Block |
| PSD | Power Spectral Density |
| PSS | Primary Synchronization Sequence |
| PUSCH | Physical Uplink Shared Channel |
| RACH | Random Access Channel |
| RAT | Radio Access Technology |
| RF | Radio Frequency |
| RRC | Radio Resource Control |
| SoC | System-on-a-Chip |
| SC-FDMA | Single-Carrier, Frequency Division Multiple Access |
| SFBC | Space Frequency Block Coding |
| SIM | Subscriber Identity Module or Subscriber Identification Module |
| SNR | Signal to Noise Ratio |
| SRS | Sounding Reference Signal |
| SSS | Secondary Synchronization Sequence |
| TDD | Time Division Duplex |
| Tx | Transmitter |
| UE | User Equipment |
| UL | Uplink |
| USS | UE-specific Search Space |
| WB-LTE | Wideband LTE (i.e., corresponds to legacy LTE) |
| ZC | Zadoff-Chu algorithm |

The subject matter of this disclosure is in no way restricted to OFDM systems. The exemplary embodiments described herein regarding the use of a CP directed at an OFDM system may be directed at other systems. Further, while the subject matter of this disclosure is applicable to symbol or signal transmissions such as SRS transmissions on the uplink, it is also applicable to any symbol or signal transmission performed by any node on any physical link (e.g., sidelinks such as D2D or wireless self-backhaul links). In addition, while the subject matter of this disclosure may be directed at SRS symbols or signals, it is also applicable to other types of symbols or signals transmitted adjacent to one or more symbols or signals having different power levels.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications that may be made to this configuration without departing from the scope of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed:

1. A method performed by a wireless device in a wireless communication system, the method comprising:
   receiving, from a network node in the wireless communication system, an indication of whether a transmit signal is to be transmitted with a guard interval, wherein the indication is based on:
   an increase of power levels between a first pair of consecutive symbols of a series of symbols, the increase being at least equal to or above a predefined first threshold, and a decrease of power levels between a second pair of consecutive symbols of the series of symbols, the decrease being at least equal to or above a predefined second threshold,
   wherein the first pair of consecutive symbols and the second pair of consecutive symbols are consecutive pairs; and
   in response to the received indication, determining whether to transmit the transmit signal with the guard interval, wherein in response to determining that the transmit signal is to be transmitted with the guard interval:
   generating the transmit signal comprising the series of symbols, including the first pair of consecutive symbols and the second pair of consecutive symbols that are to be transmitted at different power levels, with power ramping to occur over respective power transition periods between the first pair of consecutive symbols and between the second pair of consecutive symbols; and
   transmitting the transmit signal with the guard interval overlapping at least partly with the respective power transition periods.

2. A wireless device in a wireless communication system, the wireless device comprising:
   processing circuitry; and
   memory containing instructions executable by the processing circuitry whereby the wireless device is operative to:
   receive, from a network node in the wireless communication system, an indication of whether a transmit signal is to be transmitted with a guard interval, wherein the indication is based on:
an increase of power levels between a first pair of consecutive symbols of a series of symbols, the increase being at least equal to or above a predefined first threshold, and a decrease of power levels between a second pair of consecutive symbols of the series of symbols, the decrease being at least equal to or above a predefined second threshold,
wherein the first pair of consecutive symbols and the second pair of consecutive symbols are consecutive pairs; and
in response to the received indication, determine whether to transmit the transmit signal with the guard interval, wherein in response to a determination that the transmit signal is to be transmitted with the guard interval, the wireless device is further operative to:
generate the transmit signal comprising the series of symbols, including the first pair of consecutive symbols and the second pair of consecutive symbols that are to be transmitted at different power levels, with power ramping to occur over respective power transition periods between the first pair of consecutive symbols and between the second pair of consecutive symbols; and transmit the transmit signal with the guard interval overlapping at least partly with the respective power transition periods.

3. The wireless device of claim 2, wherein the instructions are such that the wireless device is operative to transmit the transmit signal comprising the series of symbols within a subframe that comprises one or more symbol periods, wherein each symbol period in the subframe has the same duration, wherein a duration of the subframe is greater than a collective duration of the one or more symbol periods in the subframe, and wherein a duration of the guard interval is at least a portion of a difference between the duration of the subframe and the collective duration of the one or more symbol periods in the subframe.

4. The wireless device of claim 2, wherein the instructions are such that the wireless device is operative to transmit the transmit signal comprising the series of symbols within a subframe that comprises two or more symbol periods, with at least two symbol periods having different symbol period durations, and wherein a duration of the guard interval equals one of the different symbol period durations.

5. The wireless device of claim 2, wherein the instructions are such that the wireless device is operative to transmit the transmit signal comprising the series of symbols within a subframe that comprises two or more symbol periods, with at least two symbol periods having different symbol period durations, and wherein a duration of the guard interval is a function of the different symbol period durations.

6. The wireless device of claim 2, wherein the instructions are such that the wireless device is operative to transmit the transmit signal comprising the series of symbols within a subframe that comprises two or more symbol periods, wherein each symbol period in the subframe has the same symbol period duration, wherein a duration of the guard interval equals an integer multiple of the symbol period duration, and wherein the integer multiple is an integer with a value greater than or equal to one.

7. The wireless device of claim 2, wherein the series of symbols are orthogonal frequency division multiplexed (OFDM) symbols, wherein each OFDM symbol includes a first or a second cyclic prefix (CP), wherein a duration of the second CP is equivalent to a duration of the first CP and an extended duration of the second CP, and wherein a duration of the guard interval plus the extended duration of the second CP equals a predetermined duration.

8. The wireless device of claim 2, wherein the series of symbols are orthogonal frequency division multiplexed (OFDM) symbols, wherein each OFDM symbol includes a first or a second predetermined signal, wherein a duration of the second predetermined signal is equivalent to a duration of the first predetermined signal and an extended duration of the second predetermined signal, and wherein a duration of the guard interval plus the extended duration of the second predetermined signal equals a predetermined duration.

9. The wireless device of claim 7, wherein the predetermined duration is at least one of:
a difference between a duration of a subframe that comprises one or more symbol periods, and a collective duration of the one or more symbol periods in the subframe;
one of different symbol period durations in the subframe;
a duration defined as a function of the different symbol period durations in the subframe; and
an integer multiple of a symbol period duration.

10. The wireless device of claim 8, wherein the instructions are such that the wireless device is further operative to receive, from the network node in the wireless communication system, another indication of whether to use the first or the second predetermined signal.

11. A method performed by a network node in a wireless communication system, the method comprising: determining whether a wireless device in the wireless communication system is to transmit a signal with a guard interval based on:
an increase of power levels between a first pair of consecutive symbols of a series of symbols, the increase being at least equal to or above a predefined first threshold, and a decrease of power levels between a second pair of consecutive symbols of the series of symbols, the decrease being at least equal to or above a predefined second threshold,
wherein the first pair of consecutive symbols and the second pair of consecutive symbols are consecutive pairs; and
in response to determining that the wireless device is to transmit the signal with the guard interval, transmitting, to the wireless device, an indication of whether the wireless device is to transmit the signal with the guard interval, wherein in response to transmitting the indication that the wireless device is to transmit the signal with the guard interval:
receiving the signal having the series of symbols and with the guard interval overlapping at least partly with respective power transition periods; and
obtaining the series of symbols from the received signal, including the first pair of consecutive symbols and the second pair of consecutive symbols transmitted at different power levels, with power ramping occurring over the respective power transition periods between the first pair of consecutive symbols and between the second pair of consecutive symbols.

12. A network node in a wireless communication system, the network node comprising:
processing circuitry; and memory containing instructions executable by the processing circuitry whereby the network node is operative to:
determine whether a wireless device in the wireless communication system is to transmit a signal with a guard interval based on:
an increase of power levels between a first pair of consecutive symbols of a series of symbols, the increase being at least equal to or above a predefined first threshold, and a decrease of power levels between a second pair of consecutive symbols of the series of symbols, the decrease being at least equal to or above a predefined second threshold, wherein the first pair of consecutive symbols and the second pair of consecutive symbols are consecutive pairs; and in response to a determination that the wireless device is to transmit the signal with the guard interval, transmit, to the wireless device, an indication of whether the wireless device is to transmit the signal with the guard interval, wherein in response to the transmission of the indication that the wireless device is to transmit the signal with the guard interval, the network node is further operative to:

receive the signal having the series of symbols and with the guard interval overlapping at least partly with respective power transition periods; and obtain the series of symbols from the received signal, including the first pair of consecutive symbols and the second pair of consecutive symbols transmitted at different power levels, with power ramping occurring over the respective power transition periods between the first pair of consecutive symbols and between the second pair of consecutive symbols.

13. The network node of claim 12, wherein the instructions are such that the network node is operative to receive the series of symbols within a subframe that comprises one or more symbol periods, wherein each symbol period in the subframe has the same duration, wherein a duration of the subframe is greater than a collective duration of the one or more symbol periods in the subframe, and wherein a duration of the guard interval is at least a portion of a difference between the duration of the subframe and the collective duration of the one or more symbol periods in the subframe.

14. The network node of claim 12, wherein the instructions are such that the network node is operative to receive the series of symbols within a subframe that comprises two or more symbol periods, with at least two symbol periods having different symbol period durations, and wherein a duration of the guard interval equals one of the different symbol period durations.

15. The network node of claim 12, wherein the instructions are such that the network node is operative to receive the series of symbols within a subframe that comprises two or more symbol periods, with at least two symbol periods having different symbol period durations, and wherein a duration of the guard interval is a function of the different symbol period durations.

16. The network node of claim 12, wherein the instructions are such that the network node is operative to receive the series of symbols within a subframe that comprises two or more symbol periods, wherein each symbol period in the subframe has the same symbol period duration, wherein a duration of the guard interval equals an integer multiple of the symbol period duration, and wherein the integer multiple is an integer with a value greater than or equal to one.

17. The network node of claim 12, wherein the series of symbols are orthogonal frequency division multiplexed (OFDM) symbols, wherein each OFDM symbol includes a first or a second cyclic prefix (CP), wherein a duration of the second CP is equivalent to a duration of the first CP and an extended duration of the second CP, and wherein a duration of the guard interval plus the extended duration of the second CP equals a predetermined duration.

18. The network node of claim 12, wherein the series of symbols are orthogonal frequency division multiplexed (OFDM) symbols, wherein each OFDM symbol includes a first or a second predetermined signal, wherein a duration of the second predetermined signal is equivalent to a duration of the first predetermined signal and an extended duration of the second predetermined signal, and wherein a duration of the guard interval plus the extended duration of the second predetermined signal equals a predetermined duration.

19. The network node of claim 17, wherein the predetermined duration is at least one of:
  a difference between a duration of a subframe that comprises one or more symbol periods, and a collective duration of the one or more symbol periods in the subframe;
  one of different symbol period durations in the subframe;
  a duration defined as a function of the different symbol period durations in the subframe; and
  an integer multiple of a symbol period duration.

20. The network node of claim 18, wherein the instructions are such that the network node is further operative to transmit, to the wireless device in the wireless communication system, another indication of whether to use the first or the second predetermined signal.

* * * * *